US008693520B2

(12) United States Patent
Kim et al.

(10) Patent No.: US 8,693,520 B2
(45) Date of Patent: Apr. 8, 2014

(54) CHANNEL HOPPING BASED CONTENT PROTECTION HAVING AN OUT-OF-BAND COMMUNICATION BAND

(75) Inventors: Yong Jin Kim, San Diego, CA (US); Cong T. Nguyen, San Diego, CA (US); Babak Aryan, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 534 days.

(21) Appl. No.: 12/894,775

(22) Filed: Sep. 30, 2010

(65) Prior Publication Data

US 2011/0080935 A1 Apr. 7, 2011

Related U.S. Application Data

(60) Provisional application No. 61/247,947, filed on Oct. 1, 2009.

(51) Int. Cl.
*H04B 1/00* (2006.01)
(52) U.S. Cl.
USPC ........... 375/133; 370/329; 370/341; 370/431; 455/426.1; 708/109
(58) Field of Classification Search
None
See application file for complete search history.

(56) References Cited

U.S. PATENT DOCUMENTS

| | | | |
|---|---|---|---|
| 4,807,248 A | 2/1989 | Pyatt et al. | |
| 5,079,768 A | 1/1992 | Flammer | |
| 5,097,485 A | 3/1992 | O'connor et al. | |
| 5,123,029 A | 6/1992 | Bantz et al. | |
| 5,130,987 A | 7/1992 | Flammer | |
| 5,177,765 A | 1/1993 | Holland et al. | |
| 6,981,157 B2 | 12/2005 | Jakobsson et al. | |
| 2006/0029018 A1* | 2/2006 | Mizukami et al. | ............ 370/328 |
| 2006/0209766 A1 | 9/2006 | Britz et al. | |
| 2006/0264168 A1 | 11/2006 | Corbett et al. | |
| 2007/0291822 A1 | 12/2007 | Staley et al. | |
| 2009/0007198 A1* | 1/2009 | Lavender et al. | ............... 725/91 |
| 2009/0080377 A1 | 3/2009 | Ganguly et al. | |
| 2011/0225417 A1 | 9/2011 | Maharajh et al. | |
| 2012/0008786 A1 | 1/2012 | Cronk et al. | |
| 2012/0099459 A1 | 4/2012 | Uhlik et al. | |

FOREIGN PATENT DOCUMENTS

WO WO9506377 3/1995

OTHER PUBLICATIONS

International Search Report and Written Opinion—PCT/US2010/051228, International Search Authority—European Patent Office—Nov. 26, 2010.

* cited by examiner

*Primary Examiner* — Adolf Dsouza
(74) *Attorney, Agent, or Firm* — Won Tae Kim

(57) ABSTRACT

One feature provides a method for transmitting content to a receiving device, by establishing channel hopping sequence information with the receiving device via a first communication band. The channel hopping sequence information is associated with a plurality of traffic channels within a second communication band. Moreover, the method entails transmitting the content to the receiving device through the plurality of traffic channels via the second communication band using a channel hopping scheme implemented according to the channel hopping sequence information. In one embodiment, establishing the channel hopping sequence information with the receiving device via the first communication band further includes: obtaining a channel hopping sequence key; and transmitting the channel hopping sequence key to the receiving device within the first communication band.

50 Claims, 16 Drawing Sheets

CHANNEL HOPPING BASED CONTENT PROTECTION HAVING AN OUT-OF-BAND COMMUNICATION BAND

CLAIM OF PRIORITY UNDER 35 U.S.C. §119

The present application for Patent claims priority to U.S. Provisional Application No. 61/247,947 entitled "Channel Hopping-Based Content Protection" tiled Oct. 1, 2009, assigned to the assignee hereof and hereby expressly incorporated by reference herein.

BACKGROUND

1. Field

One feature relates to protecting wireless transmissions, and, more particularly, to a method for protecting broadcasts of unsecured and/or unencrypted copyrighted content by using a channel hopping scheme in lieu of content encryption.

2. Background

Increasingly, mobile devices, such as cellular phones, are capable of receiving and storing multimedia content. For example, a mobile device may have a video camera that allows the mobile device to generate and store video content. As another example, a mobile device may be equipped with a receiver that allows it to receive satellite or terrestrial television signals, such as, MediaFLO® signals which are delivered over a forward link only network from a content provider. Although the mobile device may be capable of displaying the content itself, a user of the device may desire to wirelessly transmit the content to a larger display device, such as a television, in order to view the content on a larger screen.

For example, while at home or work, a user of a mobile device capable of receiving MediaFLO® television signals may desire to wirelessly transmit the received video content to a television set within the same room as the mobile device. Thus, the user intends to transmit the content locally and does not desire to broadcast the content to other unauthorized receivers. However, depending on the transmission power and receiver antenna capability, the content may be unintentionally propagated to a larger region. However, such content may be subject to copyrights laws and/or be private to the user of the mobile device. Thus, broadcasting such content to a larger region may be undesirable, and even illegal. This is especially problematic if the content transmitted is not subject to traditional forms of content security, such as encryption.

Therefore, there exists a need to protect unencrypted content during transmission to a receiving device to prevent unauthorized receivers from accessing the content.

SUMMARY

One feature provides a method for transmitting content to a receiving device, the method comprising: establishing channel hopping sequence information with the receiving device via a first communication band, the channel hopping sequence information associated with a plurality of traffic channels within a second communication band; and transmitting the content to the receiving device through the plurality of traffic channels via the second communication band using a channel hopping scheme implemented according to the channel hopping sequence information. In one embodiment, establishing the channel hopping sequence information with the receiving device via the first communication band further includes: obtaining a channel hopping sequence key; and transmitting the channel hopping sequence key to the receiving device within the first communication band. In another embodiment, transmitting the content to the receiving device via the second communication band further includes: generating a channel hopping sequence using the channel hopping sequence key; and transmitting the content to the receiving device through the plurality of traffic channels within the second communication band according to the channel hopping sequence.

In one embodiment, establishing the channel hopping sequence information with the receiving device via the first communication band further includes: transmitting a first traffic channel identifier to the receiving device via the first communication band, the first traffic channel identifier indicative of a first traffic channel within the second communication band. In another embodiment, transmitting the content to the receiving device via the second communication band further includes: transmitting a first portion of the content to the receiving device via the first traffic channel within the second communication band. In another embodiment, establishing the channel hopping sequence information with the receiving device via the first communication band further includes: transmitting a second traffic channel identifier to the receiving device via the first communication band, the second traffic channel identifier indicative of a second traffic channel within the second communication band. In another embodiment, transmitting the content to the receiving device via the second communication band further includes: transmitting a second portion of the content to the receiving device via the second traffic channel within the second communication band. In one embodiment, the second communication band is an in-band communication band that is separate and independent to the first communication band that is an out-of-band communication band.

In another embodiment, the channel hopping sequence information is a channel hopping sequence. In another embodiment, the first communication band is within 1 (one) and 430 (four hundred thirty) terahertz (which is the Infrared Band). In another embodiment, the second communication band is within 300 (three hundred) megahertz and 300 (three hundred) gigahertz (which is the UHF, SHF, and EHF bands). In another embodiment, the plurality of traffic channels are a plurality of physical channels occupying different frequencies in the second communication band. In yet another embodiment, the plurality of traffic channels are a plurality of logical channels having different coding schemes. In yet another embodiment, the content is unencrypted multimedia content. In yet another embodiment, the content includes a video signal component, and the content is transmitted to the receiving device for display on the receiving device. In another embodiment, the content is received at the mobile device from a content provider. In another embodiment, transmitting the content to the receiving device via the second communication band further includes: automatically forwarding the content received from the content provider to the receiving device for display on the receiving device.

BRIEF DESCRIPTION OF THE DRAWINGS

The features, nature, and advantages of the present features may become more apparent from the detailed description set forth below when taken in conjunction with the drawings in which like reference characters identify correspondingly throughout.

DETAILED DESCRIPTION

Figure 1:
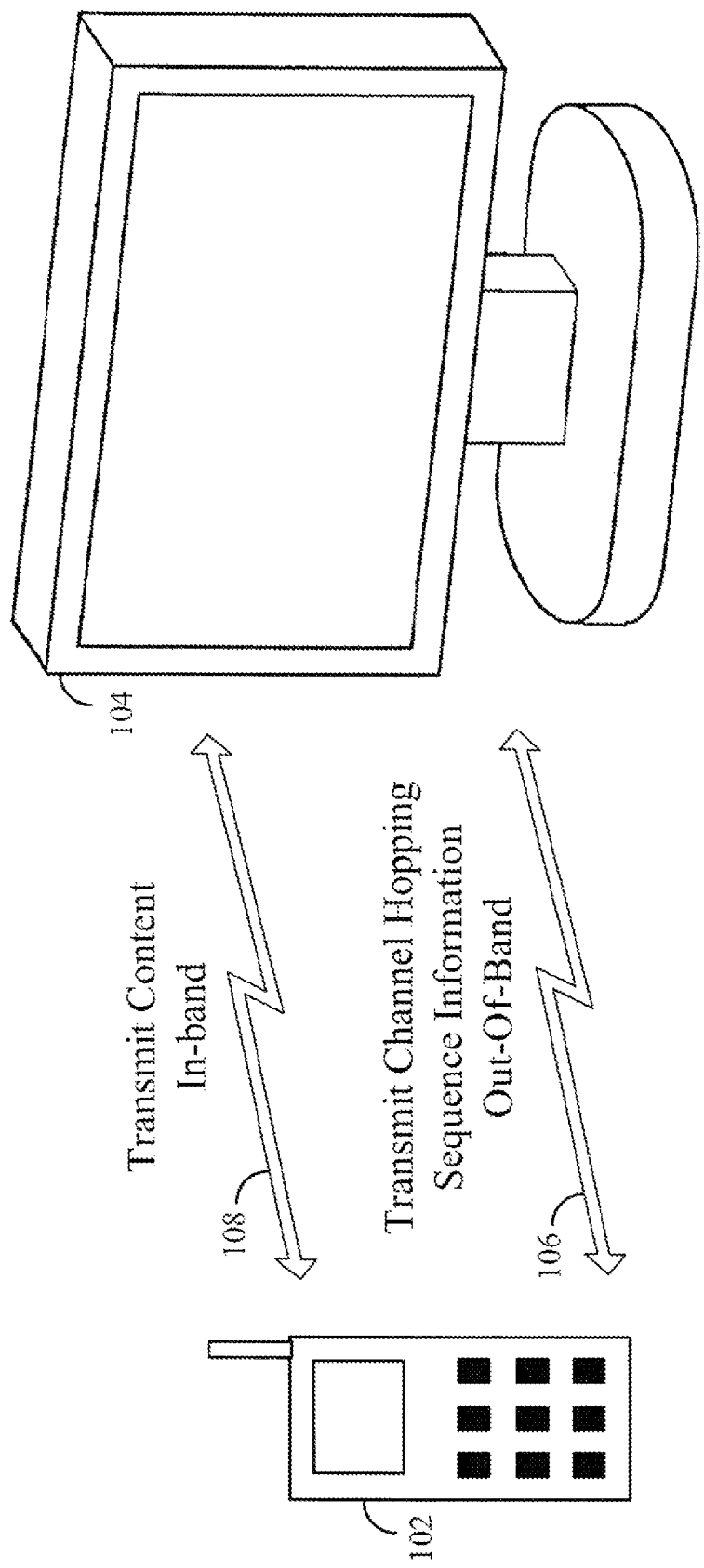
FIG. 1 illustrates a functional diagram of one embodiment of a content transfer protection system.

In the following description, specific details are given to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, structures and techniques may not be shown in detail iii order not to obscure the embodiments.

In the following description, certain terminology is used to describe certain features of one or more embodiments. For instance, the term "mobile device" includes, but is not limited to, a wireless device, a mobile phone, a mobile communication device, a user communication device, a personal digital assistant, a mobile palm-held computer, a laptop computer, a portable television, a portable audio player, and/or other types of wireless devices typically carried by individuals and/or having some form of communication capabilities (e.g., wireless, infrared, short-range radio, etc.). Herein, communication that occurs "out-of-band" refers to the communication of any type of data transmitted, programmed, and/or otherwise communicated between two transceivers that is separate and independent from communication within the "in-band" communication band.

Overview

Techniques utilizing channel hopping are presented herein to protect content, particularly unencrypted content, during transmission from a mobile device to a receiving device from reception by unauthorized receivers.

A mobile device may desire to transmit content to a receiving device. For example, the mobile device may be a handheld, portable television that wishes to transmit MediaFLO® television signals (e.g., the content) to a large screen high-definition television (HDTV) (e.g., the receiving device) for display. The mobile device transmits the content on a plurality of traffic channels that are within an in-band communication band. The mobile device transmits the content across the traffic channels using channel hopping.

To transmit content using channel hopping, the content bitstream is broken up into a plurality of portions (e.g., segments) and each portion is transmitted across a different traffic channel chosen at random from the available set of traffic channels at different times. Although the same traffic channel may be reused to transmit different portions of the content, this may not be an issue because the portions of content are transmitted across traffic channels that are chosen substantially at random according to a channel hopping sequence. The channel hopping sequence is a pseudorandom sequence that is known to both the mobile device (i.e., the transmitter) and the receiving device (i.e., receiver) and serves as the information used by two devices to know what traffic channels to tune to and at what times in order to accurately and completely receive the data. Unauthorized receivers that do not have the channel hopping sequence will be unable to receive the content because they would not know what traffic channels to tune to, and at what times. Thus, the channel hopping sequence is sensitive information that should be kept secret between the authorized devices and preferably not broadcast to unauthorized receivers.

In the techniques presented herein to protect content using channel hopping, a dual band communication approach is presented. One communication band, known as the in-band communication band, transmits the content to a receiving device using channel hopping according to a channel hopping sequence. Another band, known as the out-of-band communication band, transmits channel hopping sequence information that may include, for example, the channel hopping sequence or a key that may be used to generate the channel hopping sequence. This dual band approach allows the in-band communication band to be, for example, a high power communication band that is capable of transmitting large amounts of data (e.g., video content) quickly and over a longer range. The out-of-band communication band may be a short range communication band that transmits the sensitive channel hopping sequence information within a very small region, such as a room within a building. In this fashion, the sensitive channel hopping sequence information is protected from unwanted reception by unauthorized receivers who are not within the shorter range of the out-of-band communication band. Meanwhile, the mobile device is free to transmit the content to the receiving device using the high power, high throughput in-band communication band.

Exemplary Content Protection Environment

FIG. 1 illustrates a functional diagram of one embodiment of a content transmission protection system. A mobile device 102 communicates wirelessly with a receiving device 104 across two different communication bands 106 and 108 in order to securely transmit content to the receiving device 104. An "in-band" communication band 108 comprises a plurality of traffic channels that are used by the mobile device 102 to transmit content data (referred herein as "content") to the receiving device 104. An "out-of-band" communication band 106 may comprise one or more control channels that are used by the mobile device 102 to transmit channel hopping sequence information to the receiving device 104. The out-of-band communication band 106 (e.g., "first communication band") and the in-band communication band 108 (e.g., "second communication band") are different communication bands that are separate and independent from one another. For example, in one embodiment the two communication bands may be non-overlapping in frequency. In another embodiment, both communication bands may overlap in frequency (e.g., they may both use the unlicensed 2.4 GHz band) but use different coding schemes, such as different frequency-hopping spread spectrum sequences, so as not to substantially interfere with one another.

FIG. 1 illustrates that the mobile device 102 may be a mobile phone, and the receiving device 104 may be a high-definition television. However, these are merely examples, and as noted above, the mobile device 102 may be any wireless device, such as a laptop, a handheld, portable television, a portable audio player, etc. The receiving device 104 may be any electronic device equipped with wireless communication, such as a stereo system, a laptop computer, a monitor, a projector, a desktop computer, etc. The content transmitted from the mobile device 102 to the receiving device 104 may be multimedia content, such as video and/or audio data, for display using the receiving device 104. The content may be unencrypted data that the user of the mobile device 102 wishes to securely transmit to the receiving device 104 so that other unauthorized receivers cannot easily receive the content. For example, the content may comprise text, images, video, and/or sounds that are subject to copyright protection, and thus the user may wish to avoid violating any copyright laws by securely transmitting the content.

Referring to FIG. 1, the content is transmitted in-band 108 from the mobile device 102 to the receiving device 104 across a plurality of traffic channels using a channel hopping scheme. For example, the content may be broken up into a multitude of portions and each portion may be transmitted across a different traffic channel at a different point in time. These traffic channels may be different from one another either physically (e.g., different frequency channels) and/or logically (e.g., the channels use different coding schemes, time slots, etc.). Either way, the sequence of traffic channels used to transmit the content is based on a channel hopping sequence that is known to both the transmitter (i.e., mobile device 102) and the receiver (i.e., receiving device 104), and ideally not known to unauthorized receivers. A receiver that knows the channel hopping sequence may receive the content because the receiver knows which traffic channels to "hop" to (i.e., tune to) in order to receive the plurality of content portions. Moreover, if the sequence is pseudorandom in nature it will be very difficult for an unauthorized receiver that does not have prior knowledge of the sequence to calculate the sequence on its own.

In one embodiment, the receiving device 104 receives channel hopping sequence information that includes information related to the channel hopping sequence from the mobile device 102. The channel hopping sequence information is transmitted out-of-band 106 from the mobile device 102 to the receiving device 104. This channel hopping sequence information may be the sequence itself or a channel hopping sequence key (referred herein as a "key") that may be used by the receiving device 104 to generate the sequence.

In other embodiments, channel hopping sequence information is transmitted a plurality of times during the course of one content transfer session. Each transmission indentifies a particular traffic channel and/or channels that the receiving device 104 should tune to for a particular time period in order to receive the content. Thus, in one embodiment, the receiving device 104 periodically receives channel hopping sequence information out-of-band 106 from the mobile device 102 informing the receiving device 104 of what traffic channels to tune to in-band 108 to receive all the content portions.

Thus, the content protection scheme shown in FIG. 1 utilizes two communication bands that transmit content and channel hopping sequence information separately. The in-band communication band 108 is used to transmit content according to a channel hopping sequence, and the out-of-band communication band 106 is used to transmit channel hopping sequence information used by the receiving device 104 to correctly receive the content.

This two band approach for transmitting content and channel hopping sequence information separately to a receiving device 104 allows, for example, the in-band 108 traffic channels to transmit the content with relatively high power, high throughput, and longer range. By contrast, the out-of-band 106 control channel(s) may be low power transmissions that have low throughput and limited range. For example, the in-band communication band 108 may be within the Ultra High Frequency (UHF), Super High Frequency (SHF), and/or Extremely High Frequency (EHF) bands that together range from 300 megahertz to 300 gigahertz and may be used for high data rate transmissions that may be necessary to transmit multimedia content. The out-of-band communication band 106 may be within the infrared spectrum (IR) (e.g., 1 terahertz to 470 terahertz) that is limited in range because it does not easily permeate walls. In some embodiments, the out-of-band communication band 106 may also be within the UHF, SHF, and/or EHF bands but use a different communications protocol than the in-band 108 communication channels. For example, the out-of-band 106 communication band may use low power, low throughput communications protocols like Zigbee® and Bluetooth® to securely transmit the channel hopping sequence information.

Thus, the mobile device 102 can transmit sensitive information such as the channel hopping sequence information over a band that is designed for short range communications making reception of such sensitive information by unauthorized receivers much more difficult. By contrast, the content itself can be transmitted using a longer range communication band that also has high throughput for high data transmissions.

Exemplary Mobile Device

Figure 2:
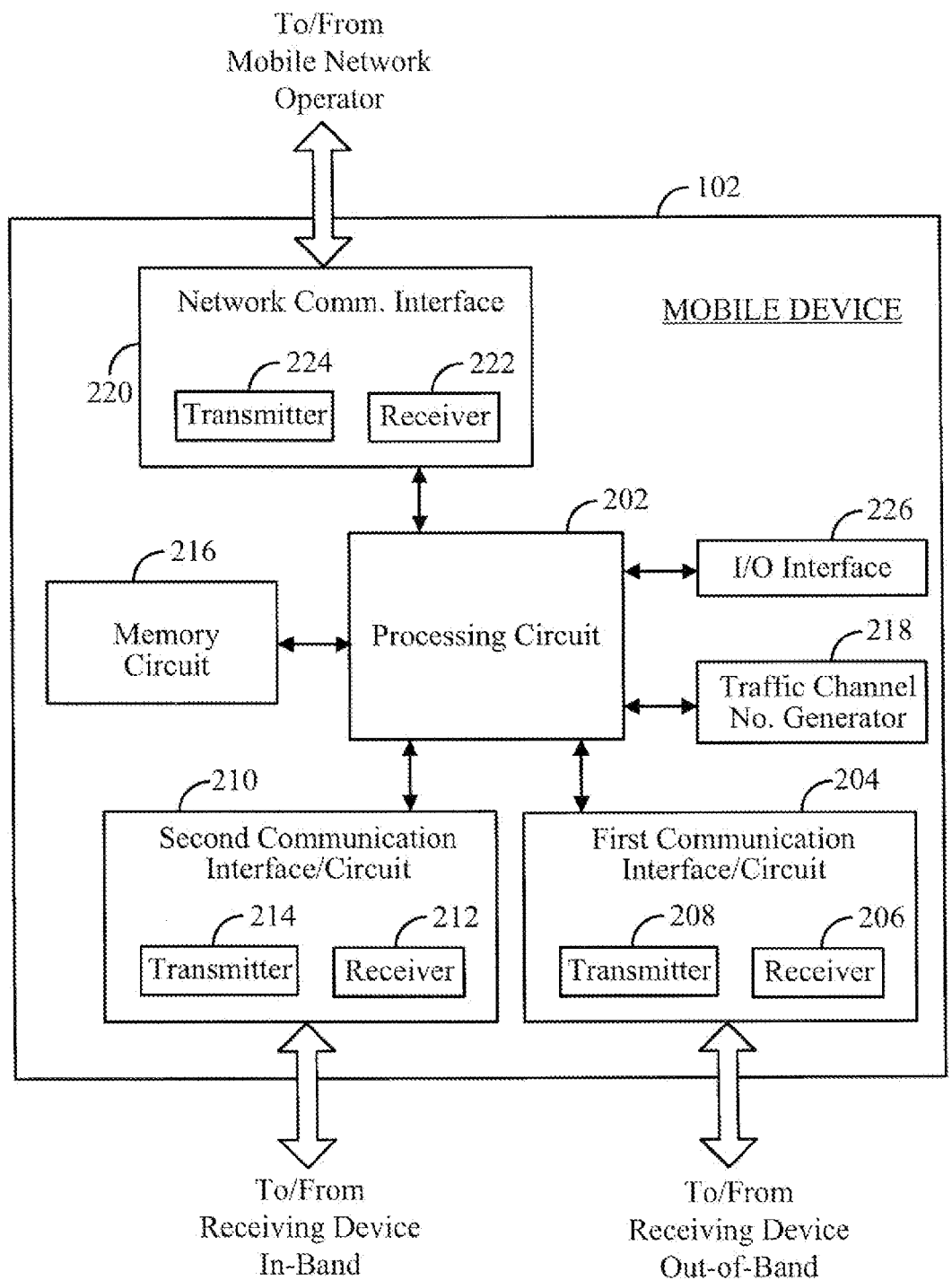
FIG. 2 illustrates one embodiment of a mobile device capable of transmitting content using channel hopping.

FIG. 2 illustrates a functional block diagram of one embodiment of the mobile device 102. The mobile device 102 may comprise a processing circuit 202, a memory circuit 216, a first communication interface/circuit 204, a second communication interface/circuit 210, a traffic channel number generator 218, a network communication interface 220, and an input/output (I/O) interface 226. The network communication interface 220 may comprise a receiver 222 for receiving data and a transmitter 224 for transmitting data. The network communication interface 220 allows the mobile device 102 to communicate with a mobile network operator of the mobile device 102. For example, if the mobile device 102 is a mobile telephone then the network communication interface 220 allows the mobile telephone to connect to a cellular and/or satellite network owned by the mobile network operator to receive, among other things, multimedia content. As another example, the mobile device 102 may be a portable handheld television or mobile phone that receives multimedia content, such as MediaFLO® television signals from. the mobile network operator (e.g., MediaFLO® service provider, and/or a "content provider") via the network communication interface 220. In some embodiments, the network communication interface 220 may not need a transmitter 224 if for example, the mobile device 102 may act as a passive receiver of content and does not transmit data back to the network.

The memory circuit 216 (e.g., memory, memory module, etc.) allows the mobile device 102 to store content, channel hopping sequence information, and other data. For example, the memory circuit 216 may store content received from the network, or store content generated by the mobile device 102 itself, such as videos and/or music created by the mobile device's 102 camera and microphone hardware (e.g., I/O interface 226). The processing circuit 202 (e.g., processor, processing module, etc.) may process the content, for example, for display on the mobile device 102. The processing circuit 202 may also send instructions to the first and second communication interfaces/circuits 204 and 210 to transmit and receive content and channel hopping sequence information, respectively, with the receiving device 104.

The first communication interface/circuit 204 (referred to herein also as a "first communication interface" and a "first communication circuit") may comprise physical interface hardware (e.g., antennas, up converters, etc.) and/or one or more processing circuits (e.g., processing circuit 202) for allowing the mobile device 102 to communicate with the receiving device 104 through the out-of-band communication band 106. The first communication interface 204 may comprise a receiver 206 for receiving data out-of-band from the receiving device 104, and a transmitter 208 for transmitting channel hopping sequence information and other data out-of-band 106 to the receiving device 104. In some embodiments, the first communication interface 204 does not comprise a receiver 206, and therefore out-of-band 106 communications with the receiving device 104 are uni-directional. In other words, in some embodiments the mobile device 102 transmits channel hopping sequence information and other data to the receiving device 104 but the receiving device 104 does not transmit data out-of-band 106 back to the mobile device 102.

The second communication interface/circuit 210 (referred to herein also as a "second communication interface" and a "second communication circuit") may comprise physical interface hardware (e.g., antennas, up converters, etc.) and/or one or more processing circuits (e.g., processing circuit 202) for allowing the mobile device 102 to communicate with the receiving device 104 through the in-band communication band 108. The second communication interface 210 may comprise a receiver 212 for receiving data in-band 108 from the receiving device 104, and a transmitter 214 for transmitting content in-band 108 to the receiving device 104. In some embodiments, the second communication interface 210 does not comprise a receiver 212, and therefore in-band 108 communications with the receiving device 104 are uni-directional. In other words, in some embodiments the mobile device 102 transmits content and other data in-band 108 to the receiving device 104 but the receiving device 104 does not transmit data in-band 108 back to the mobile device 102.

The traffic channel number generator 218 may comprise a pseudorandom number generator that generates a pseudorandom sequence and selects, substantially at random, a traffic channel according to the pseudorandom sequence. The traffic channels selected are used to transmit portions of content at periodic time intervals or at random time intervals over the in-band communication band 108. The sequence generated by the pseudorandom number generator may be transmitted as channel hopping sequence information to the receiving device 104 over the out-of-band communication band 106. In some embodiments, the traffic channel number generator 218 generates the pseudorandom sequence according to a key established between and/or shared by the mobile device 102 and the receiving device 104. FIG. 2 illustrates the traffic channel number generator 218 as a module separate from the processing circuit 202. However, in some embodiments, the functions performed by the traffic channel number generator 218 may be performed by the processing circuit 202.

The I/O interface 226 enables the mobile device 102 to receive inputs signals and transmit output signals. For example, the I/O interface 226 may include a keyboard, a touchscreen display, a display, speakers, various USB cable interfaces, a mouse, and other various I/O devices used with mobile devices 102.

Exemplary Receiving Device

Figure 3:
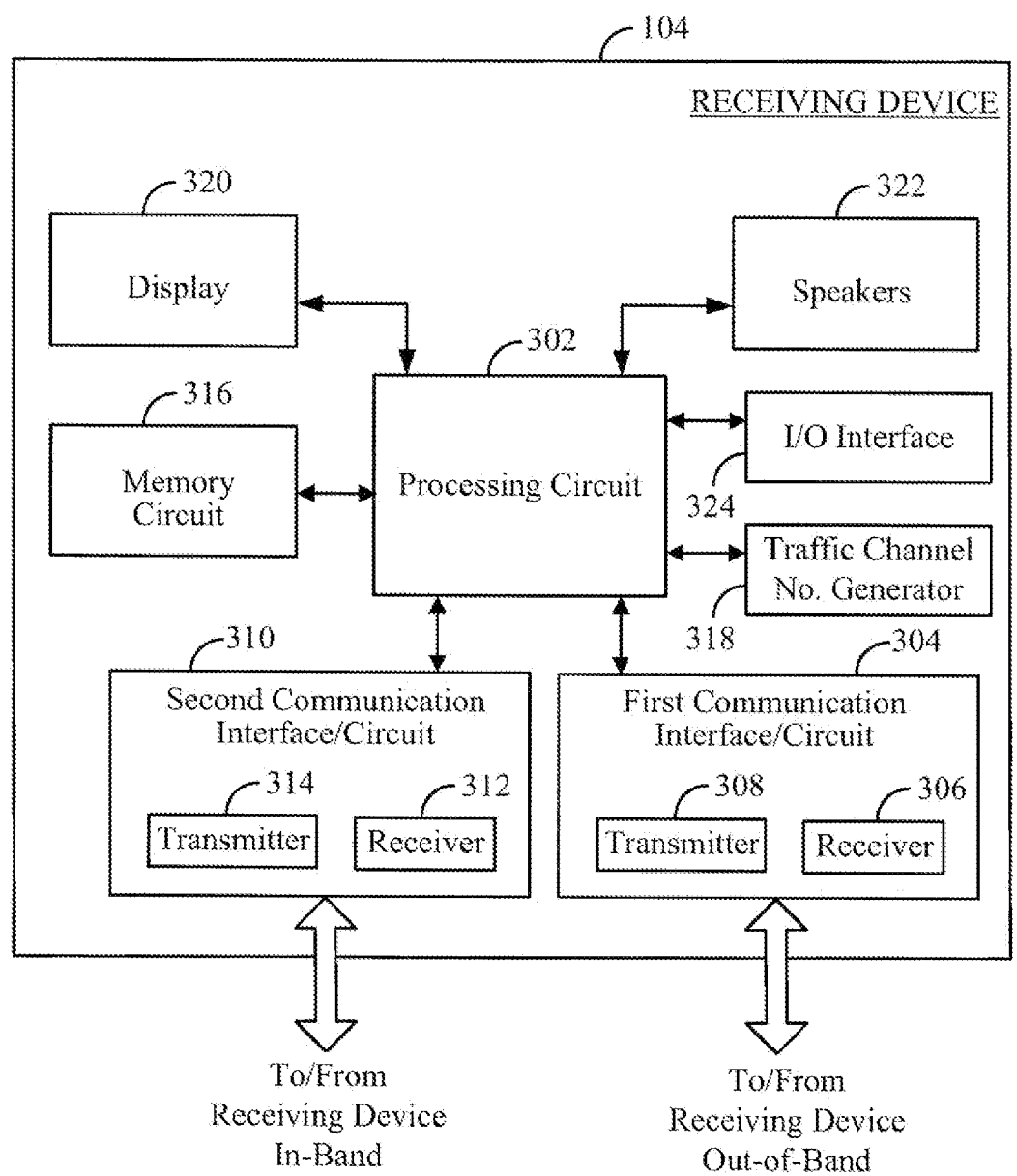
FIG. 3 illustrates one embodiment of a receiving device capable of transmitting content using channel hopping.

FIG. 3 illustrates a functional block diagram of one embodiment of the receiving device 104. The receiving device 104 may comprise a processing circuit 302, a memory circuit 316, a first communication interface/circuit 304, a second communication interface/circuit 310, a traffic channel number generator 318, a display 320, speakers 322, and an input/output (I/O) interface 324. The memory circuit 316 allows the receiving device 104 to store content, channel hopping sequence information, and other data. The processing circuit (e.g., processor, processing module, etc.) 302 may process the content, for example, for display on the receiving device 104. The processing circuit 302 may also instruct the first and second communication interfaces/circuits 304 and 310 to transmit and receive content and channel hopping sequence information, respectively, with the mobile device 102.

The first communication interface/circuit 304 (referred to herein also as a "first communication interface" and a "first communication circuit") may comprise physical interface hardware (e.g., antennas, up converters, etc.) and/or one or more processing circuits (e.g., processing circuit 302) for allowing the receiving device 104 to communicate with the mobile device 102 through the out-of-band communication band 106. The first communication interface 304 may comprise a receiver 306 for receiving channel hopping sequence information and other data out-of-band 106 from the mobile device 102, and a transmitter 308 for transmitting data out-of-band 106 to the mobile device 102. In some embodiments, the first communication interface 304 does not comprise a transmitter 308, and therefore out-of-band 106 communication with the mobile device 102 is uni-directional. In other words, in some embodiments the receiving device 104 receives channel hopping sequence information and other data from the mobile device 102, but the mobile device 102 does not receive data out-of-band 106 from the receiving device 104.

The second communication interface/circuit 310 (referred to herein also as a "second communication interface" and a "second communication circuit") may comprise physical interface hardware (e.g., antennas, up converters, etc.) and/or one or more processing circuits (e.g., processing circuit 302) for allowing the receiving device 104 to communicate with the mobile device 102 through the in-band communication band 108. The second communication interface 310 may comprise a receiver 312 for receiving content in-band 108 from the receiving device 104, and a transmitter 314 for transmitting data in-band 108 to the receiving device 104. In some embodiments, the second communication interface 310 does not comprise a transmitter 314, and therefore in-band 108 communication with the mobile device 102 is uni-directional. In other words, in some embodiments the receiving device receives content and other data in-band 108 from the mobile device 102, but the mobile device 102 does not receive data in-band 108 from the receiving device 104.

In some embodiments, the receiving device 104 may comprise a traffic channel number generator 318. In one embodiment, the traffic channel number generator 318 generates a pseudorandom sequence according to a key shared by the mobile device 102 and the receiving device 104. The key may be transmitted to the receiving device 104 out-of-band 106 within the channel hopping sequence information. The pseudorandom sequence generated by the shared key is used by the receiving device 104 to tune to the correct traffic channels in-band 108 at the correct time intervals to receive the content. In other embodiments the receiving device 104 does not have a traffic channel number generator 318. Rather, the channel hopping sequence information received from the mobile device 102 contains information (e.g., traffic channel identifiers, timing information, etc.) the receiving device 104 uses to tune to the correct in-band 108 traffic channels at the correct time. FIG. 3 illustrates the traffic channel number generator 318 as a module separate from the processing circuit 302. However, in some embodiments, the functions performed by the traffic channel number generator 318 may be performed by the processing circuit 302.

In some embodiments, the receiving device 104 may comprise a display 320. The display 320 allows the receiving device 104 to display any multimedia content having a video component received from the mobile device 102. In some embodiments, the receiving device 104 may comprise speakers 322 that allows the receiving device 104 to play any multimedia content having an audio component received from the mobile device 102. For example, the receiving device 104 may be a television or high-definition television capable of playing video and audio multimedia content. The receiving device 104 may also comprise an I/O interface 324 that enables the receiving device 104 to receive inputs signals and transmit output signals. For example, the I/O interface 324 may include a keyboard, a touchscreen display, an additional display, additional speakers, various USB cable interfaces, a mouse, and other various I/O devices used with receiving devices 104.

Multiple Transmission of Channel Hopping Sequence Information

Figure 4:
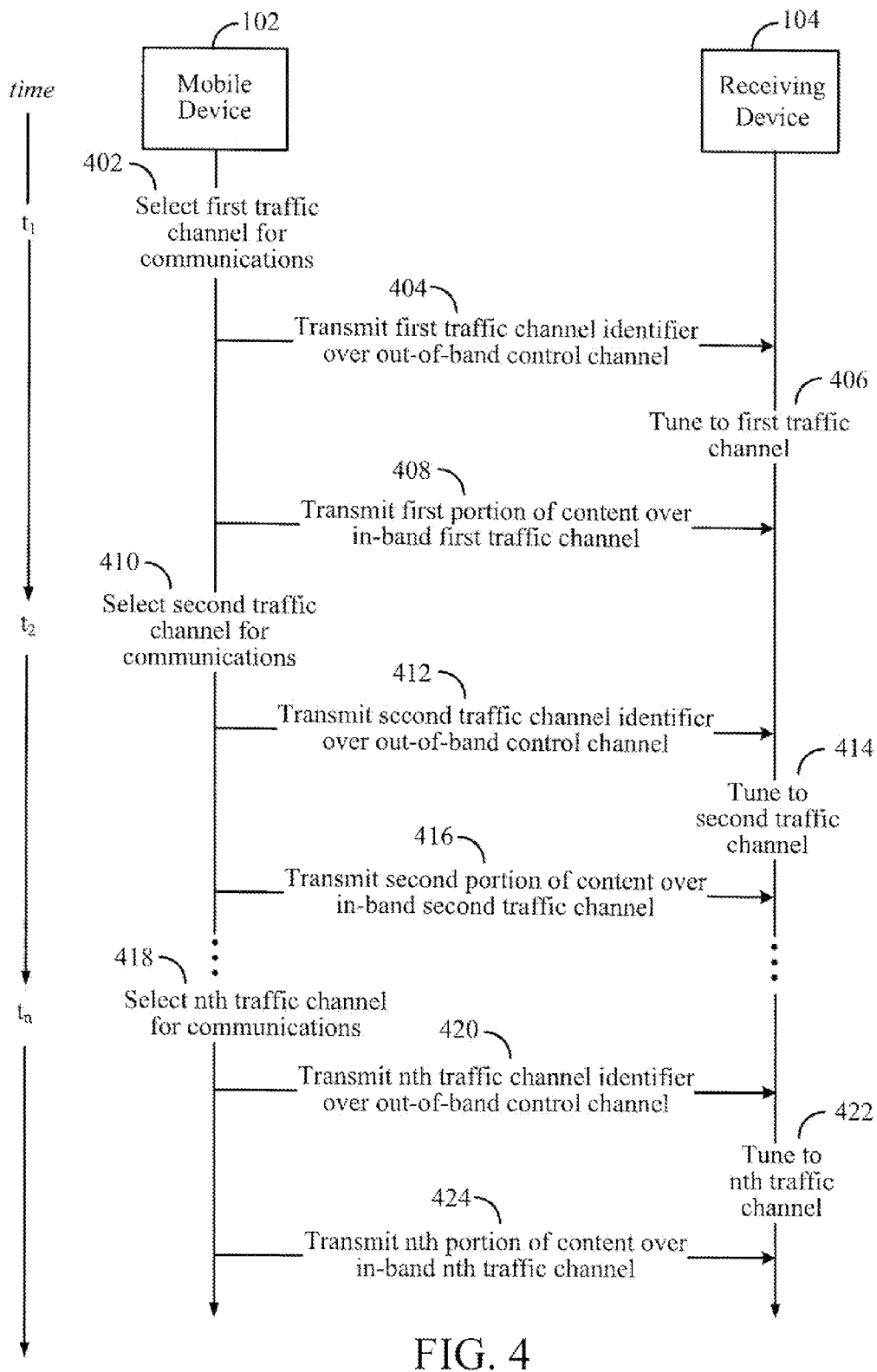
FIG. 4 illustrates a high level time diagram between the mobile device and the receiving device according to one embodiment for securing content transmission using channel hopping.

In some embodiments, channel hopping sequence information may be transmitted out-of-band 106 from the mobile device 102 to the receiving device 104 multiple times during the course of a content transfer session. A content transfer session is the transmission of all the portions of the content. FIG. 4 illustrates a high level time diagram between the mobile device 102 and the receiving device 104 according to one embodiment for securing content transmission using channel hopping. In step 402, the mobile device 102 selects a first traffic channel at time $t_1$ over which to transmit a first portion of the content. A pseudorandom number generator assists the mobile device 102 in selecting the first traffic channel substantially at random from the plurality of traffic channels available. The mobile device 102 then transmits a first traffic channel identifier over an out-of-band 106 control channel to the receiving device 104 in step 404. The first traffic channel identifier is indicative of the first traffic channel. The first traffic channel identifier notifies the receiving device 104 as to what traffic channel to tune to and expect the first portion of the content on. In step 406, the receiving device 104 tunes to the first traffic channel. In step 408, the mobile device 102 transmits the first portion of the content to the receiving device 104 over the first traffic channel located in-band 108.

At time $t_2$, in step 410, the mobile device 102 selects a second traffic channel substantially at random according to, for example, the next output of the pseudorandom generator used to generate the first traffic channel number. In step 412, the mobile device 102 transmits a second traffic channel identifier over an out-of-band 106 control channel to the receiving device 104. The second traffic channel identifier is indicative of the second traffic channel, and informs the receiving device 104 as to what traffic channel to tune to next and expect the a second portion of the content on. In step 414, the receiving device 104 tunes to the second traffic channel. In step 416, the mobile device 102 transmits the second portion of the content to the receiving device 104 over the second traffic channel located in-band 108.

In this manner, the mobile device 102 transmits "n" portions of the content over a plurality of traffic channels located within the in-band communications band 108. The receiving device 104 is notified ahead of time by the traffic channel identifiers transmitted out-of-band as to what traffic channels to tune to in-band before the mobile device 102 transmits a portion of the content on the selected traffic channel. The mobile device may hop from one traffic channel to the subsequent traffic channel periodically in time, or after a random time interval.

Let "n" represent any integer between three and the number of the last portion of the content to be transmitted. Then, at time $t_n$, in step 418, the mobile device 102 selects the nth traffic channel to transmit the nth portion of the content. The nth traffic channel may be a traffic channel that has already been used for content transmission before. However, the random nature in which the traffic channels are selected from the available traffic channels makes it difficult for an unauthorized receiver to receive the content since they will not know which traffic channel to tune to at a given time. The mobile device 102 in step 420 transmits an nth traffic channel identifier to the receiving device 104 over a control channel located within the out-of-band communications band 106. The nth traffic channel identifier is indicative of the nth traffic channel that will be used to transmit the nth portion of the content. In step 422, the receiving device 104 tunes to the nth traffic channel. In step 424, the mobile device 102 transmits the nth portion of the content to the receiving device 104 over the nth traffic channel. After the last portion of the content is transmitted, the process shown in FIG. 4 may be performed again using a different pseudorandom sequence of traffic channels and traffic channel identifiers for subsequent content transmissions.

In some embodiments, the first, second, and/or nth traffic channel identifiers transmitted by the mobile device 102 also include timing information that informs the receiving device 104 what time to expect the next portion of content on the traffic channel indicated. The timing information may also notify the receiving device 104 information related to how long the receiving device 104 should stay tuned on a particular traffic channel. For example, the first traffic channel identifier transmitted in step 404 may include information as to what traffic channel the receiving device 104 should tune to next, and also include what time the receiving device 104 should to tune to that traffic channel. The first traffic channel identifier may also include information as to how long the receiving device 104 should stay tuned to that traffic channel. This way the mobile device 102 and the receiving device 104 are synchronized in time so that content transmissions are accurately received by the receiving device 104.

As previously discussed, the mobile device 102 may use a pseudorandom number generator to select the plurality of traffic channels used to transmit the content so that an eavesdropping unauthorized receiver cannot easily predict the sequence of traffic channels used. For example, each traffic channel may be selected according to the equation:

$$\text{Traffic Channel Selected} = \text{prngf}(\text{seed}) \bmod \text{max\_channel\_number}$$

where "prngf" is a pseudorandom number generator function, "seed" is a starting state chosen at random, and "max_channel_number" is the maximum traffic channel number available for transmitting the content. Thus, each traffic channel selected for transmitting the content is chosen substantially at random to secure the transmission against unauthorized eavesdroppers.

Steps 410 and 412 may all take place while the mobile device 102 (FIG. 2) is still in the process of transmitting the first portion of the content in-band 108 over the first traffic channel (i.e., performing step 408). Thus, the receiving device 104 may receive the second traffic channel identifier over the out-of-band communications band 106 before step 408 has concluded (i.e., while the receiving device 104 is still receiving the first portion of the content). This way, the receiving device 104 will be ready to tune to the second traffic channel very soon after it has completely received the first portion of the content over the first traffic channel. Similarly, all traffic channel identifiers (e.g., step 420) transmitted to the receiving device 104 may be transmitted prior to the completion of the previous step of transmitting the content over the traffic channel.

In one embodiment, the out-of-band 106 transmissions, including the traffic channel identifiers and timing information, may all take place within the IR spectrum (e.g., 1 terahertz to 470 terahertz). Since IR transmissions do not easily permeate walls, the mobile device 102 may be within the line of sight of the receiving device 104, for example, in the same room as the receiving device 104. By transmitting the channel hopping sequence information within the IR spectrum, which includes the traffic channel identifiers and timing information, the channel hopping sequence information may not easily be received by other unauthorized receivers that are not within line of sight of the mobile device 102. For example, unauthorized receivers located in adjacent buildings or rooms will substantially be out of range to receive the channel hopping sequence information transmitted within the IR band.

In other embodiments, the out-of-band 106 transmission of the channel hopping sequence information may be accomplished using Bluetooth®, Zigbee®, other 802.11 standards, and/or by other secure communications protocols that are intended for short range communications. Use of such standards may take place within the UHF, SHF, and/or EHF bands, but are still considered "out-of-band" to the in-band 108 transmissions because they substantially do not interfere with the in-band 108 content transmissions, and are separate and independent to such traffic channel content transmissions. Since Bluetooth®, Zigbee®, and other such short range transmission protocols transmit data securely using, for example, confidentiality, authentication and key derivation with custom algorithms based on the SAFER+block cipher. The channel hopping sequence information is protected against unauthorized receivers that may be within range of the channel hopping sequence information transmissions.

Figure 5A:
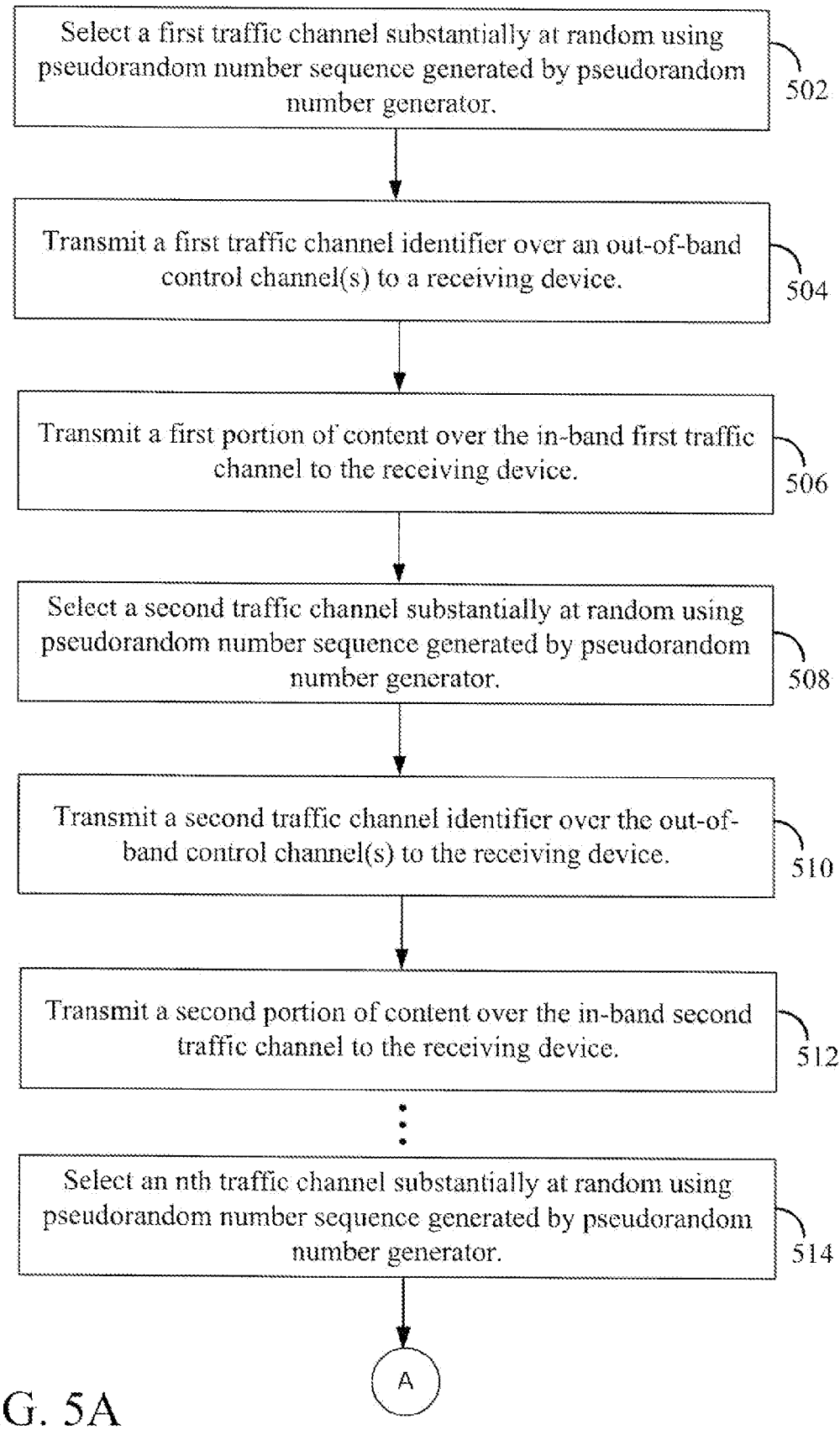
FIG. 5 (comprising FIGS. 5A and 5B) is a flowchart illustrating an exemplary method operational at a mobile device for securely transmitting content to a receiving device using channel hopping.
Figure 5B:
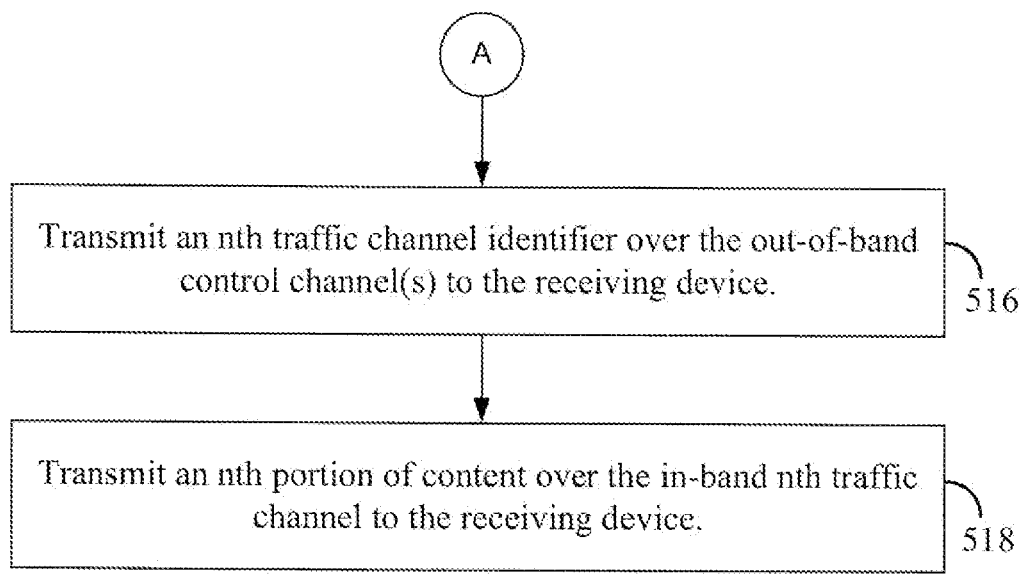

FIG. 5 (comprising FIGS. 5A and 5B) is a flowchart illustrating an exemplary method operational at a mobile device for securely transmitting content to a receiving device using channel hopping. At step 502, the mobile device 102 selects a first traffic channel substantially at random from, for example, a pseudorandom number sequence generated by a pseudorandom number generator. For example, the first and subsequent traffic channels may be selected according to the equation:

$$\text{Traffic Channel Selected} = \text{prngf}(\text{seed}) \bmod \text{max\_channel\_number}$$

where "prngf" is a pseudorandom number generator function, "seed" is a starting state chosen at random, and "max channel number" is the maximum traffic channel number available for transmitting the content. Thus, each traffic channel selected for transmitting the content is chosen substantially at random to secure the transmission against unauthorized eavesdroppers.

At step 504, the mobile device 102 transmits, using for example the first communication interface 204, a first traffic channel identifier over one or more out-of-band 106 control channel(s) to the receiving device 104. The first traffic channel identifier is indicative of the first traffic channel, and notifies the receiving device 104 as to what traffic channel to tune to and expect the first portion of the content on. The first traffic channel identifier may also include timing information that informs the receiving device 104 what time to tune to the first traffic channel and/or for how long to tune to that channel before switching over to the next traffic channel.

At step 506, the mobile device 102 transmits using, for example, the second communication interface 210, a first portion of the content to the receiving device 104 over the in-band 108 first traffic channel. Step 506 may be performed after the receiving device 104 has tuned to the first traffic channel. At step 508, the mobile device 102 selects a second traffic channel to transmit content over. The mobile device 102 selects the second traffic channel substantially at random by, for example, selecting the second element of the pseudorandom number sequence generated by the pseudorandom number generator. At step 510, the mobile device 102 transmits using, for example, the first communication interface 204, a second traffic channel identifier over one or more out-of-band 106 control channel(s) to the receiving device 104. The second traffic channel identifier is indicative of the second traffic channel, and notifies the receiving device 104 as to what traffic channel to tune to and expect the second portion of content on. The second traffic channel identifier may also include timing information that informs the receiving device 104 what time to tune to the second traffic channel and/or for how long to tune to that channel before switching over to the next traffic channel. Steps 508 and 510 may also be performed while the mobile device 102 is still completing step 506. Specifically, the mobile device 102 may select the second traffic channel and transmit the second traffic channel identifier and any timing information to the receiving device 104 over the out-of-band communications band 106 while the mobile device 102 transmits the first portion of the content in-band 108.

At step 512, the mobile device 102 transmits using, for example, the second communication interface 210, a second portion of the content to the receiving device 104 over the in-band 108 second traffic channel. Step 512 may be performed after the receiving device 104 has tuned to the second traffic channel.

In this fashion, a plurality of portions of the content may be transmitted to the receiving device 104 at different times over various traffic channels until all portions of the content have been transmitted. The mobile device 102 may hop from one traffic channel to the subsequent traffic channel periodically in time, or after a random time interval. For example, let "n" represent any integer between three and the number of the last portion of content to be transmitted. Then, at step 514 the mobile device 102 selects an "nth" traffic channel to transmit content over. The mobile device 102 selects the nth traffic channel substantially at random by, for example, selecting the nth element of the pseudorandom number sequence generated by the pseudorandom number generator. At step 516, the mobile device 102 transmits an nth traffic channel identifier over one or more out-of-band 106 control channel(s) to the receiving device 104. The nth traffic channel identifier is indicative of the nth traffic channel, and notifies the receiving device 104 as to what traffic channel to tune to and expect the nth portion of content on.

The nth traffic channel identifier may also include timing information that informs the receiving device 104 what time to tune to the nth traffic channel and/or for how long to tune to that channel before switching over to the next traffic channel. Steps 514 and 516 may also be performed while the mobile device 102 is still transmitting the n−1 portion of the content. Specifically, the mobile device 102 may select the nth traffic channel and transmit the nth traffic channel identifier and any timing information to the receiving device 104 over the out-of-band communication band 106 while the mobile device 102 transmits the n−1 portion of the content in-band 108. At step 518, the mobile device 102 transmits an nth portion of the content to the receiving device 104 over the in-band 108 nth traffic channel. Step 518 may be performed after the receiving device 104 has tuned to the nth traffic channel. After the last portion of the content is transmitted, the process shown in FIG. 5 may be performed again using a different pseudorandom number sequence for subsequent content transmissions.

Figure 6A:
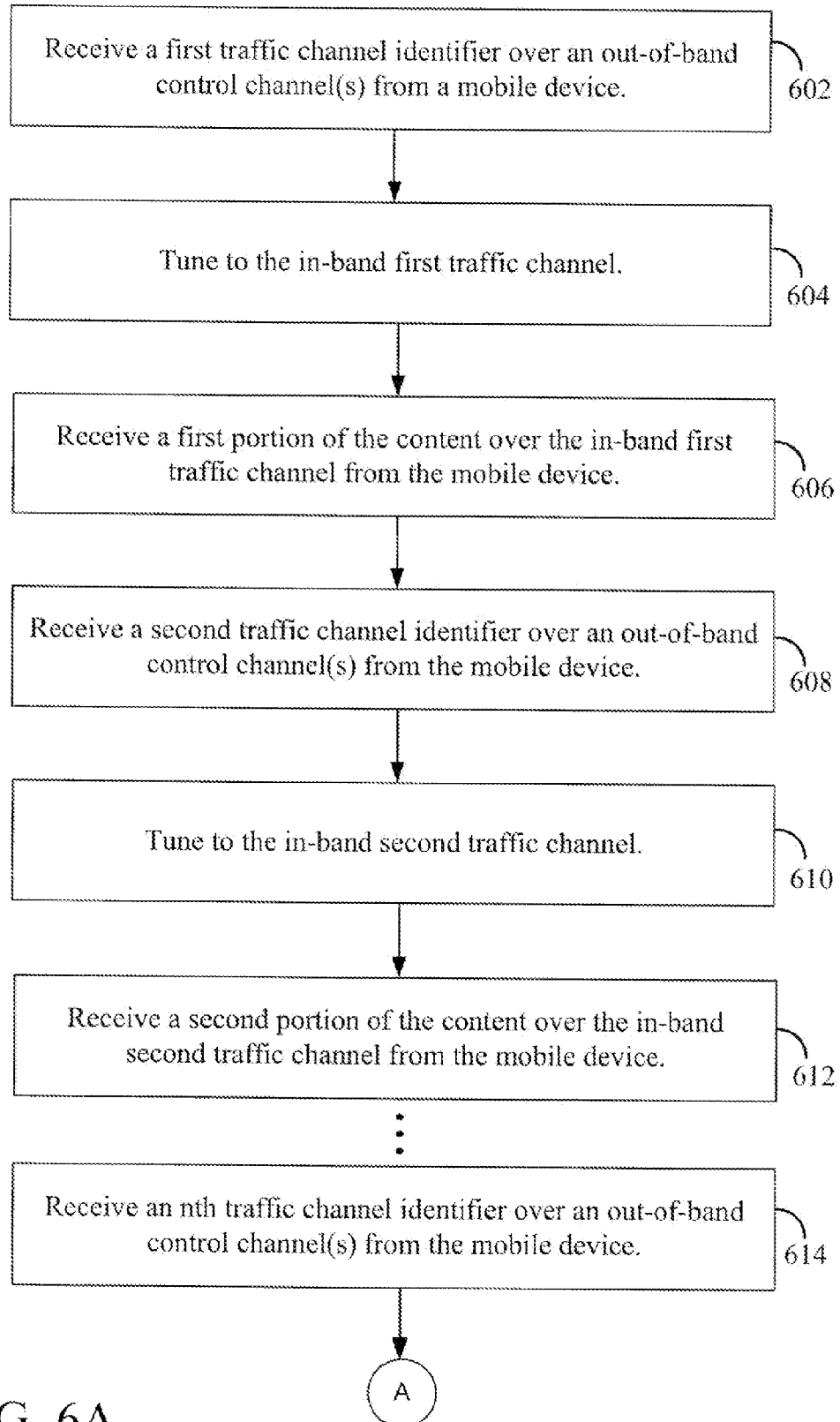
FIG. 6 (comprising FIGS. 6A and 6B) is a flowchart illustrating an exemplary method operational at a receiving device for securely receiving content from a mobile device using channel hopping.
Figure 6B:
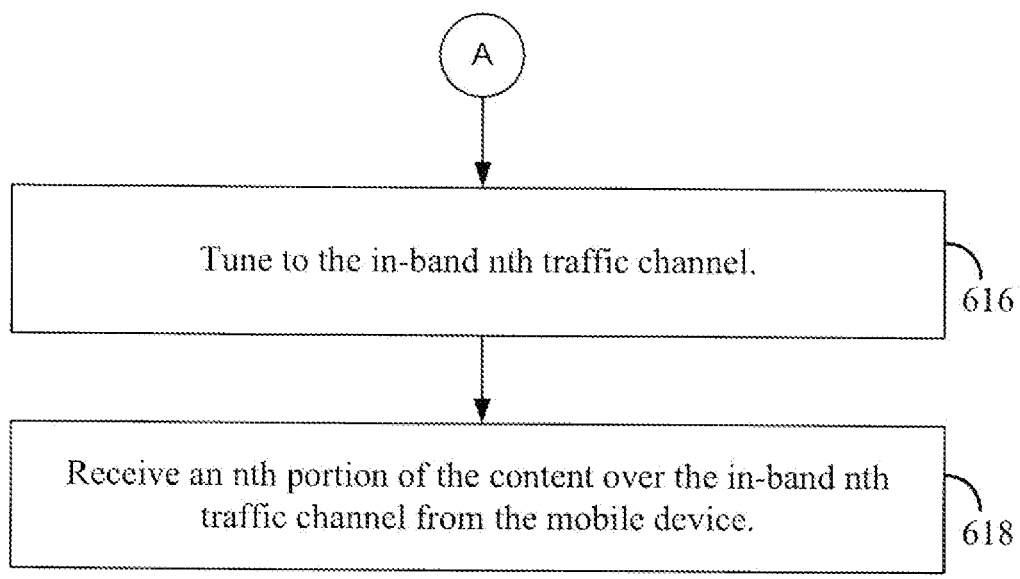

FIG. 6 (comprising FIGS. 6A and 6B) is a flowchart illustrating an exemplary method operational at a receiving device for securely receiving content from a mobile device using channel hopping. At step 602, the receiving device 104 receives using, for example, the first communication interface 304, a first traffic channel identifier over the out-of-band communication band 106. The first traffic channel identifier is indicative of the first traffic channel, and notifies the receiving device 104 as to what traffic channel to tune to in-band 108 and expect the first portion of the content on. The first traffic channel identifier may also include timing information that informs the receiving device 104 what time to tune to the first traffic channel and/or for how long to tune to that channel before switching over to the next traffic channel. At step 604, the receiving device 104 tunes to the in-band 108 first traffic channel by, for example, tuning the second communication interface 310 to the first traffic channel. At step 606, the receiving device 104 receives in-band 108 a first portion of the content over the first traffic channel from the mobile device 102. The second communication interface 310 of the receiving device 104 may be configured to receive the first portion of the content.

At step 608, the receiving device 104 receives, using for example the first communication interface 304, a second traffic channel identifier over the out-of-band communication band 106. The second traffic channel identifier is indicative of the second traffic channel, and notifies the receiving device 104 as to what traffic channel to tune to in-band 108 and expect the second portion of the content on. The second traffic channel identifier may also include timing information that informs the receiving device 104 what time to tune to the second traffic channel and/or for how long to tune to that channel before switching over to the next traffic channel. Step 608 may be performed before step 606 is complete. Specifically, the second traffic channel identifier and any timing information may be received at the receiving device 104 out-of-band 106 while the receiving device 104 receives the first portion of the content in-band 108.

At step 610, the receiving device 104 tunes to the in-band 108 second traffic channel by, for example, tuning the second communication interface 310 to the second traffic channel. At step 612, the receiving device 104 receives in-band 108 a second portion of the content over the second traffic channel from the mobile device 102. The second communication interface 310 of the receiving device 104 may be configured to receive the second portion of the content.

In this fashion, a plurality of portions of the content may be received at the receiving device 104 at different times over various traffic channels until all portions of the content have been received. The receiving device 104 may hop from one traffic channel to the subsequent traffic channel periodically in time, or after a random time interval. For example, let "n" represent any integer between three and the number of the last portion of content to be received. Then, at step 614, the receiving device 104 receives using, for example, the first communication interface 304, an nth traffic channel identifier over the out-of-band communication band 106. The nth traffic channel identifier is indicative of the nth traffic channel, and notifies the receiving device 104 as to what traffic channel to tune to in-band 108 and expect the nth portion of the content on. The nth traffic channel identifier may also include timing information that informs the receiving device 104 what time to tune to the nth traffic channel and/or for how long to tune to that channel before switching over to the next traffic channel. Step 608 may be performed before step 606 is complete. Specifically, the nth traffic channel identifier and any timing information may be received at the receiving device 104 out-of-band 106 while the receiving device 104 receives the n−1 portion of the content in-band 108.

At step 616, the receiving device 104 tunes to the in-band 108 nth traffic channel by, for example, tuning the second communication interface 310 to the nth traffic channel. At step 618, the receiving device 104 receives in-band 108 an nth portion of the content over the nth traffic channel from the mobile device 102. The second communication interface 310 of the receiving device 104 may be configured to receive the nth portion of the content. After the last portion of the content is received, the process shown in FIG. 6 may be performed again for the reception of subsequent content.

In some embodiments, the receiving device 104 may transmit acknowledgment messages to the mobile device 102 to confirm receipt of data. For example, after steps 602, 608, and 614, the receiving device 104 may transmit an acknowledgement message out-of-band 106 to the mobile device confirming receipt of the traffic channel identifier. Moreover, after steps 606, 612, and 618, the receiving device 104 may transmit an acknowledgement message in-band 108 to the mobile device 102 confirming receipt of the portions of content. Similarly, the receiving device may transmit error messages in the same fashion instead of acknowledgement messages if the data received was incorrect.

Single Transmission of Channel Hopping Sequence Information

Figure 7:
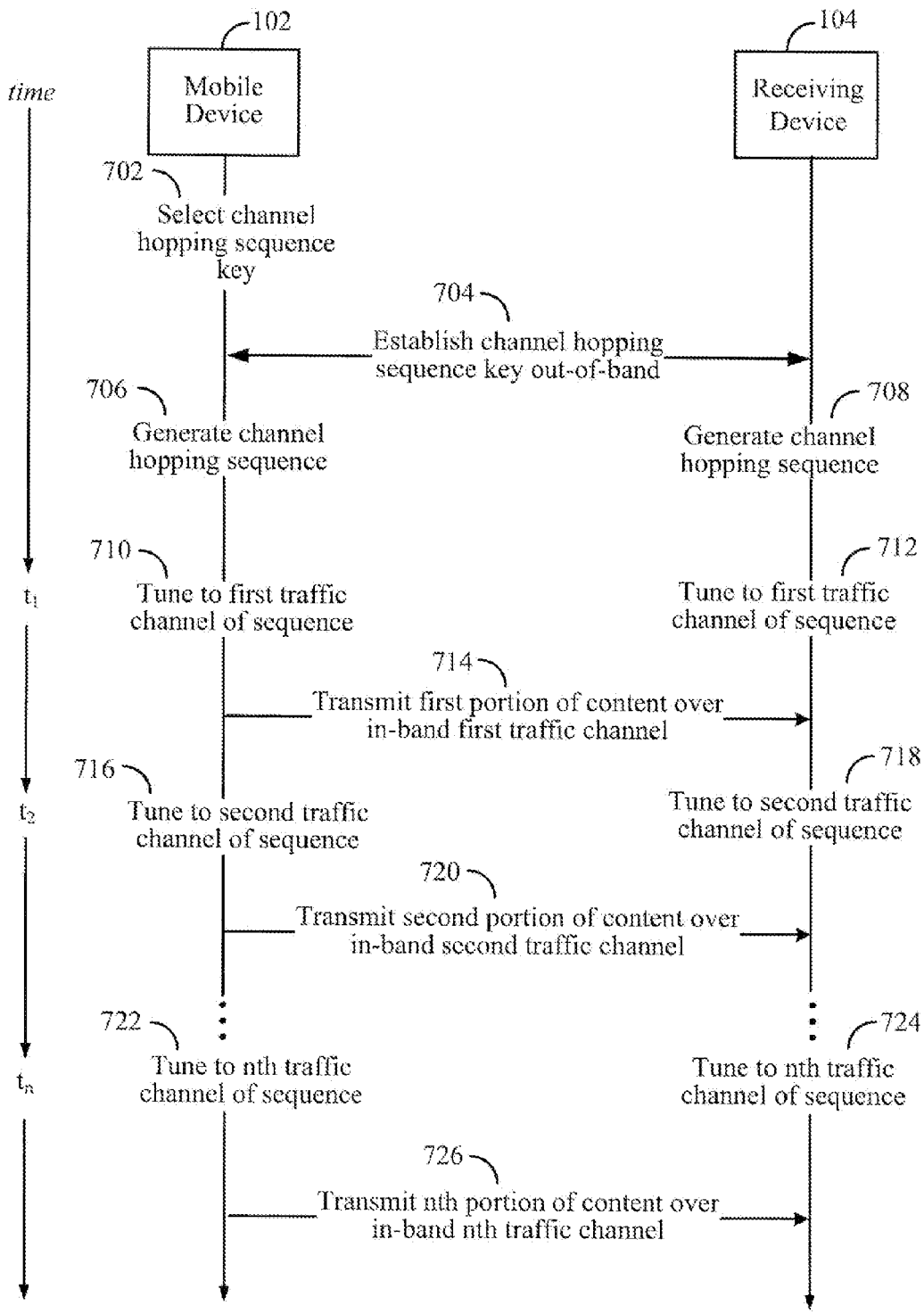
FIG. 7 illustrates a high level time diagram between the mobile device and the receiving device according to one embodiment for securing content transmission using channel hopping.

In some embodiments, channel hopping sequence information may be transmitted out-of-band 106 from the mobile device 102 to the receiving device 104 once during the course of a content transfer session. FIG. 7 illustrates a high level time diagram between the mobile device 102 and the receiving device 104 according to one embodiment for securing content transmission using channel hopping. At step 702, the mobile device 102 selects a channel hopping sequence key (herein after "key") from a plurality of keys that may be available in the memory circuit 216 of the mobile device. The key is used by a cryptographic algorithm known to both the mobile device 102 and the receiving device 104 to generate a unique channel hopping sequence. For example, a unique channel hopping sequence may be generated according to:

Channel hopping sequence=caf(key, t$_0$) mod max_channel_number where "caf" represents the cryptographic algorithm function, "key" is the channel hopping sequence key, "t$_0$" represents synchronized time zero between the mobile device 102 and the receiving device 104, and "max_channel_number" is the maximum traffic channel number available for transmitting. The key should be kept secret between the mobile device 102 and authorized receiving device(s) 104, and not be exposed to unauthorized receivers. The pseudorandom channel hopping sequence may be generated using other functions and algorithms known in the art. In one embodiment, the key is selected by a user through the I/O interface 226 of the mobile device 102. In other embodiments, the mobile device 102 selects the key and displays it to the user through the I/O interface 226, for example, through a display of the mobile device 102.

At step 704, the mobile device 102 and the receiving device 104 establish the key with one another out-of-band 106. For example, in one embodiment, the mobile device 102 may transmit the key along with timing information, such as t$_0$, to the receiving device 104 through a wireless out-of-band 106 transmission. As discussed previously, such wireless out-of-band communication bands 106 may include the IR spectrum, and/or Bluetooth®, Zigbee®, various 802.11 standards, and/or other short range communication protocols in the UHF to EHF bands. Such transmissions may thus be uni-directional, in some embodiments, where the mobile device 102 transmits the key and any timing information to the receiving device 104, but the receiving device 104 does not need to transmit any data out-of-band 106 back to the mobile device 102. In yet other embodiments, the receiving device 104 may transmit an acknowledgement message back to the mobile device 102 that notifies the mobile device 102 that the key and timing information were successfully received.

In another embodiment, the key may be established between the mobile device 102 and receiving device 104 (i.e., step 704) manually by a user. For example, the I/O interface 324 of the receiving device 104 may comprise an input knob that allows the user to select one setting of a plurality of settings. The selected setting represents a specific channel hopping frequency sequence and/or key. The receiving device 104 may thus be manually tuned to generate the correct traffic channel hopping sequence by matching the key selected at the mobile device 102. In one embodiment, the key selected at the mobile device 102 may be chosen by the mobile device 102 itself and displayed to the user so the user can manually adjust the receiving device's 104 input knob to match the key used at the mobile device 102. In another embodiment, the key selected at the mobile device 102 may be chosen by the user and manually entered at the mobile device 102 by, for example, making a selection on the I/O interface 226 of the mobile device 102.

At steps 706 and 708, the mobile device 102 and the receiving device 104 generate the channel hopping sequence based on the key that is established/shared between the mobile device 102 and the receiving device 104. Generation of the channel hopping sequence using the key, t$_0$, and cryptographic algorithm may be performed, for example, at the traffic channel number generators 218 and 318 for the mobile device 102 and the receiving device 104, respectively. In one embodiment, the mobile device 102 may perform step 706, i.e., generate the channel hopping sequence, before step 704.

At steps 710 and 712, the mobile device 102 and the receiving device 104, respectively, may tune at time t$_1$ to the first traffic channel of the channel hopping sequence generated in steps 706 and 708. In one embodiment, where step 706 is performed before step 704, the mobile device 102 may also perform step 710 before step 704.

At step 714, the mobile device 102 may transmit a first portion of the content over the in-band 108 first traffic channel to the receiving device 104, since both the mobile device 102 and the receiving device 104 have tuned to the first traffic channel. At steps 716 and 718, the mobile device 102 and the receiving device 104, respectively, may tune at time t$_2$ to the second traffic channel of the channel hopping sequence. Steps 716 and 718 may be performed after step 714 has completed, i.e., the mobile device 102 and the receiving device 104 tune to the second traffic channel after the receiving device 104 has completely and accurately received the first portion of the content. The channel hopping sequences generated at the mobile device 102 and the receiving device 104 include timing information which synchronizes both devices 102 and 104 in time so that in-band 108 content transmissions are accurately/timely received by the receiving device 104. At step 720, the mobile device 102 may transmit a second portion of the content over the in-band 108 second traffic channel to the receiving device 104, since both the mobile device 102 and the receiving device 104 have tuned to the second traffic channel.

In this fashion, the mobile device 102 and the receiving device 104 tune to the subsequent traffic channel according to the channel hopping sequence. The mobile device 102 then transmits a portion of the content to the receiving device 104 on the selected traffic channel. Also, the mobile device 102 may hop from one traffic channel to the subsequent traffic channel periodically in time, or after a random time interval. For example, let "n" equal any integer between three and the number of the last portion of the content to be transmitted. Then, at steps 722 and 724, the mobile device 102 and the receiving device 104, respectively, may tune at time t$_n$ to the nth traffic channel of the channel hopping sequence. At step 726, the mobile device 102 may transmit an nth portion of the content over the in-band nth traffic channel to the receiving device 104, since both the mobile device 102 and the receiving device 104 have tuned to the nth traffic channel. After the last portion of the content is transmitted, the process shown in FIG. 7 may be performed again using a different key for subsequent content transmissions.

Figure 8:
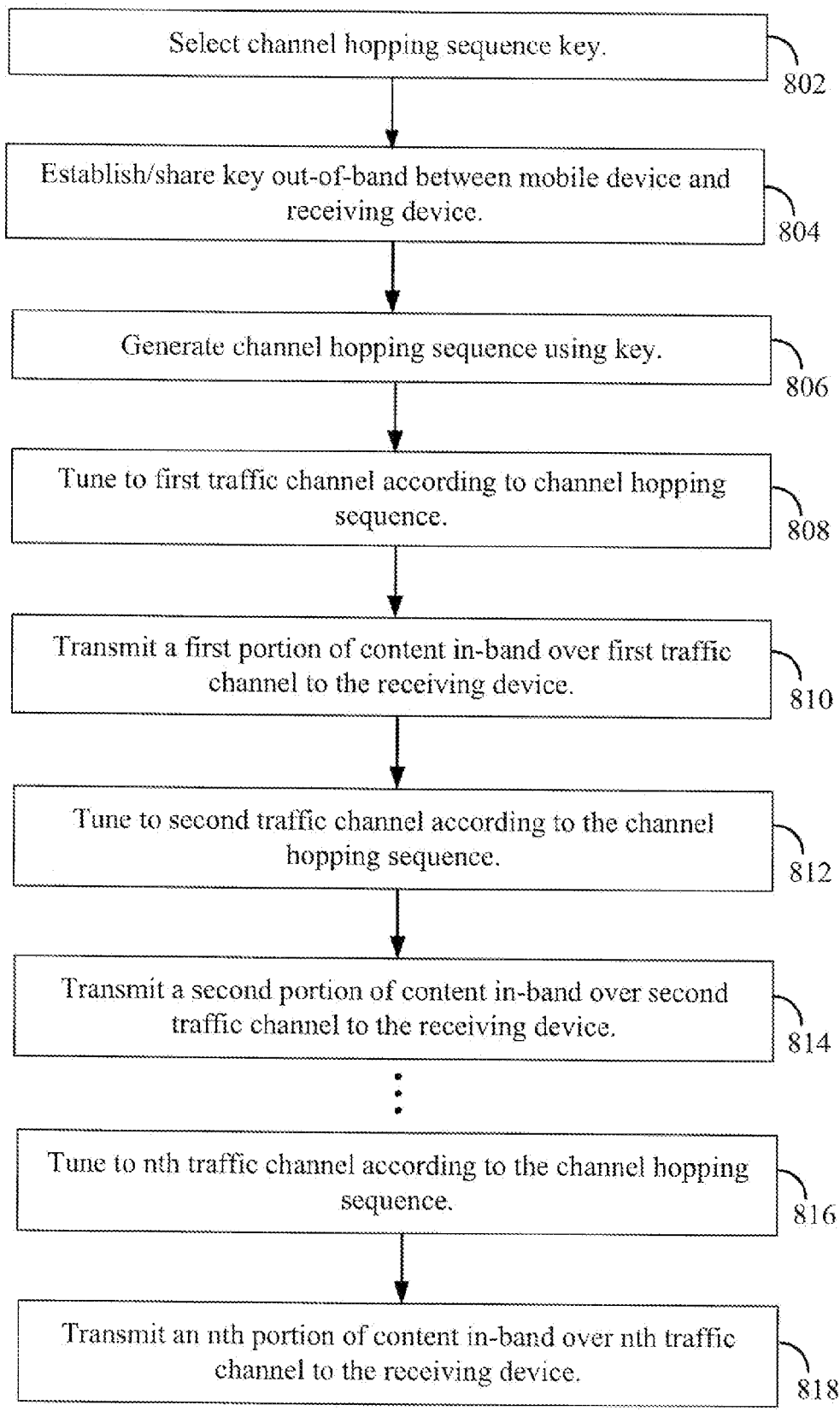
FIG. 8 is a flowchart illustrating an exemplary method operational at a mobile device for securely transmitting content to the receiving device using channel hopping.

FIG. 8 is a flowchart illustrating an exemplary method operational at a mobile device for securely transmitting content to a receiving device using channel hopping. At step 802, the mobile device 102 selects a channel hopping sequence key (herein after "key") from a plurality of keys that may be available in the memory circuit 216 of the mobile device. The key is used by a cryptographic algorithm known to both the mobile device 102 and the receiving device 104 to generate a unique channel hopping sequence. For example, a unique channel hopping sequence may be generated according to:

Channel hopping sequence=caf(key, t$_0$) mod max_channel_number where "caf" represents the cryptographic algorithm function, "key" is the channel hopping sequence key, "t$_0$" represents synchronized time zero between the mobile device 102 and the receiving device 104, and "max_channel_number" is the maximum traffic channel number available for transmitting. The key should be kept secret between the mobile device 102 and authorized receiving device(s) 104, and not be exposed to unauthorized receivers. The pseudorandom channel hopping sequence may be generated using other functions and algorithms known in the art. In one embodiment, the key is selected by a user through the I/O interface 226 of the mobile device 102. In other embodiments, the mobile device 102 selects the key and displays it to the user through the I/O interface 226, for example, through a display of the mobile device 102.

At step 804, the mobile device 102 and the receiving device 104 establish the key with one another out-of-band 106. For example, in one embodiment, the mobile device 102 at step 804 may transmit the key along with timing information, such as $t_0$, to the receiving device 104 through a wireless out-of-band 106 transmission. Such wireless out-of-band communication bands 106 may include the IR spectrum, and/or Bluetooth®, Zigbee®, various 802.11 standards, and/or other short range communication protocols in the UHF to EHF bands.

In another embodiment, the key may be established between the mobile device 102 and receiving device 104 (i.e., step 804) manually by a user. For example, the I/O interface 226 of the mobile device may display to the user which key setting was selected. The user may then go over to the receiving device 104 and enter the key setting using an input knob of the receiving device's I/O interface 324.

At step 806, the mobile device 102 generates the channel hopping sequence based on the key that is established/shared between the mobile device 102 and the receiving device 104. Generation of the channel hopping sequence using the key, $t_0$, and cryptographic algorithm may be performed, for example, at the traffic channel number generator 218 of the mobile device 102. In one embodiment, the mobile device 102 may perform step 806, i.e., generate the channel hopping sequence, before step 804.

At step 808, the mobile device 102 may tune to the first traffic channel of the channel hopping sequence generated in step 806. In one embodiment, where step 806 is performed before step 804, the mobile device 102 may also perform step 808 before step 804. At step 810, the mobile device 102 may transmit a first portion of the content over the in-band first traffic channel to the receiving device 104.

At step 812, the mobile device 102 may tune to the second traffic channel of the channel hopping sequence. Step 812 may be performed after step 810 has completed, i.e., the mobile device 102 has completely transmitted the first portion of the content. The channel hopping sequences generated at the mobile device 102 includes timing information which helps keep the mobile device 102 and receiving device 104 synchronized in time so that in-band 108 content transmissions by the mobile device 102 are accurately/timely received by the receiving device 104. At step 814, the mobile device 102 may transmit a second portion of the content over the in-band 108 second traffic channel to the receiving device 104.

In this fashion, the mobile device 102 tunes to the subsequent traffic channel according to the channel hopping sequence, and then transmits a portion of the content to the receiving device 104 on the selected traffic channel. Also, the mobile device 102 may hop from one traffic channel to the subsequent traffic channel periodically in time, or after a random time interval. For example, let "n" equal any integer between three and the number of the last portion of the content to be transmitted. Then, at step 816, the mobile device 102 may tune to the nth traffic channel of the channel hopping sequence. At step 818, the mobile device 102 may transmit an nth portion of the content over the in-band nth traffic channel to the receiving device 104. After the last portion of the content is transmitted, the process shown in FIG. 8 may be performed again using a different key for subsequent content transmissions.

Figure 9:
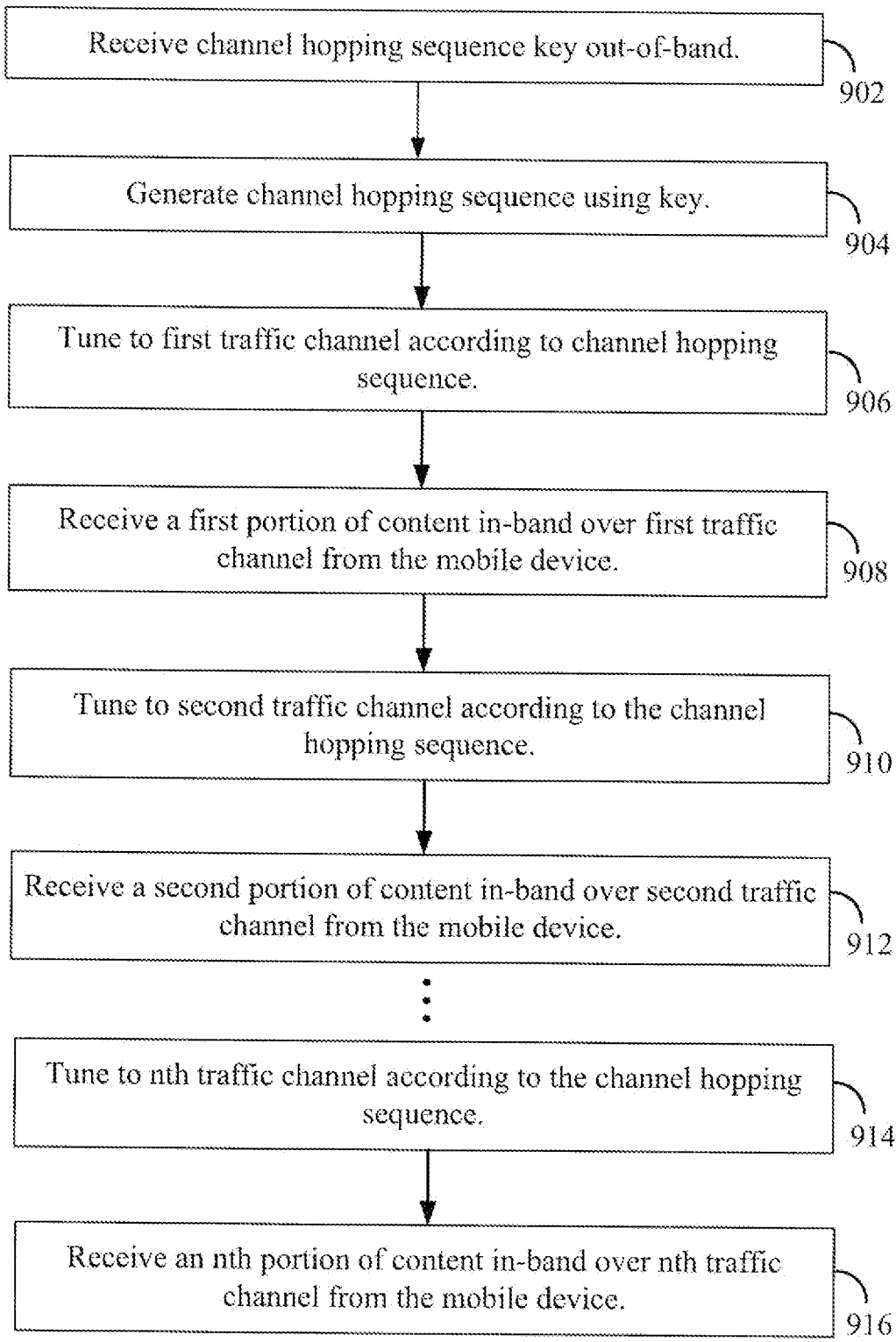
FIG. 9 is a flowchart illustrating an exemplary method operational at a receiving device for securely receiving content from a mobile device using channel hopping.

FIG. 9 illustrates one embodiment of a flowchart for a method operational at the receiving device 104 for securely receiving content from a mobile device 102 using channel hopping. At step 902, the receiving device 104 receives a channel hopping sequence key from out-of-band 106 means. For example, in one embodiment, the receiving device 104 may receive the key along with timing information, such as $t_0$, from the mobile device 102 through a wireless out-of-hand 106 transmission. Such wireless out-of-band communication bands 106 may include the IR spectrum, and/or Bluetooth®, Zigbee®, various 802.11 standards, and/or other short range communication protocols in the UHF to EHF bands. These transmissions may be uni-directional where the receiving device 104 does not need to transmit any data out-of-band 106 back to the mobile device 102. In other embodiments, the receiving device 104 may transmit an acknowledgement message back to the mobile device 102 that notifies the mobile device 102 that the key and timing information were successfully received.

In another embodiment, the receiving device 104 may receive the key manually from the user. For example, the I/O interface 324 of the receiving device 104 may comprise an input knob that allows the user to select one setting of a plurality of settings. The selected setting represents a specific channel hopping frequency sequence and/or key. The receiving device 104 may thus be manually tuned to generate the correct traffic channel hopping sequence by matching the key selected at the mobile device 102. In one embodiment, the key selected at the mobile device 102 may be chosen by the mobile device 102 itself and displayed to the user so the user can manually adjust the receiving device's 104 input knob to match the key used at the mobile device 102.

At step 904, the receiving device 104 generates the channel hopping sequence based on the received key. Generation of the channel hopping sequence using the key, $t_0$, and cryptographic algorithm may be performed, for example, at the traffic channel number generator 318 of the receiving device 104. At step 906, the receiving device 104 may tune to the first traffic channel of the channel hopping sequence generated in step 904. At step 908, the receiving device 104 may receive a first portion of the content over the in-band first traffic channel from the mobile device 102.

At step 910, the receiving device 104 may tune to the second traffic channel of the channel hopping sequence. Step 910 may be performed after step 908 has completed, i.e., the receiving device 104 has completely and accurately received the first portion of the content. The channel hopping sequence generated at the receiving device 104 includes timing information which synchronizes the receiving device 104 in time with the mobile device 102 so that in-band 108 content transmissions are accurately/timely received by the receiving device 104. At step 912, the receiving device 104 may receive a second portion of the content over the in-band second traffic channel from the mobile device 102.

In this fashion, the receiving device 104 tunes to the subsequent traffic channel according to the channel hopping sequence, and then receives a portion of the content from the mobile device 102 on the selected traffic channel. The receiving device 104 may hop from one traffic channel to the subsequent traffic channel periodically in time, or after a random time interval, in order to properly receive the content.

For example, let "n" equal any integer between three and the number of the last portion of the content to be transmitted. Then, at step 914, the receiving device 104 may tune to the nth traffic channel of the channel hopping sequence. At step 916, the receiving device 104 receives an nth portion of the content over the in-band nth traffic channel from the mobile device 102. After the last portion of the content is transmitted, the process shown in FIG. 9 may be performed again using a different key for subsequent content transmissions.

Figure 10:
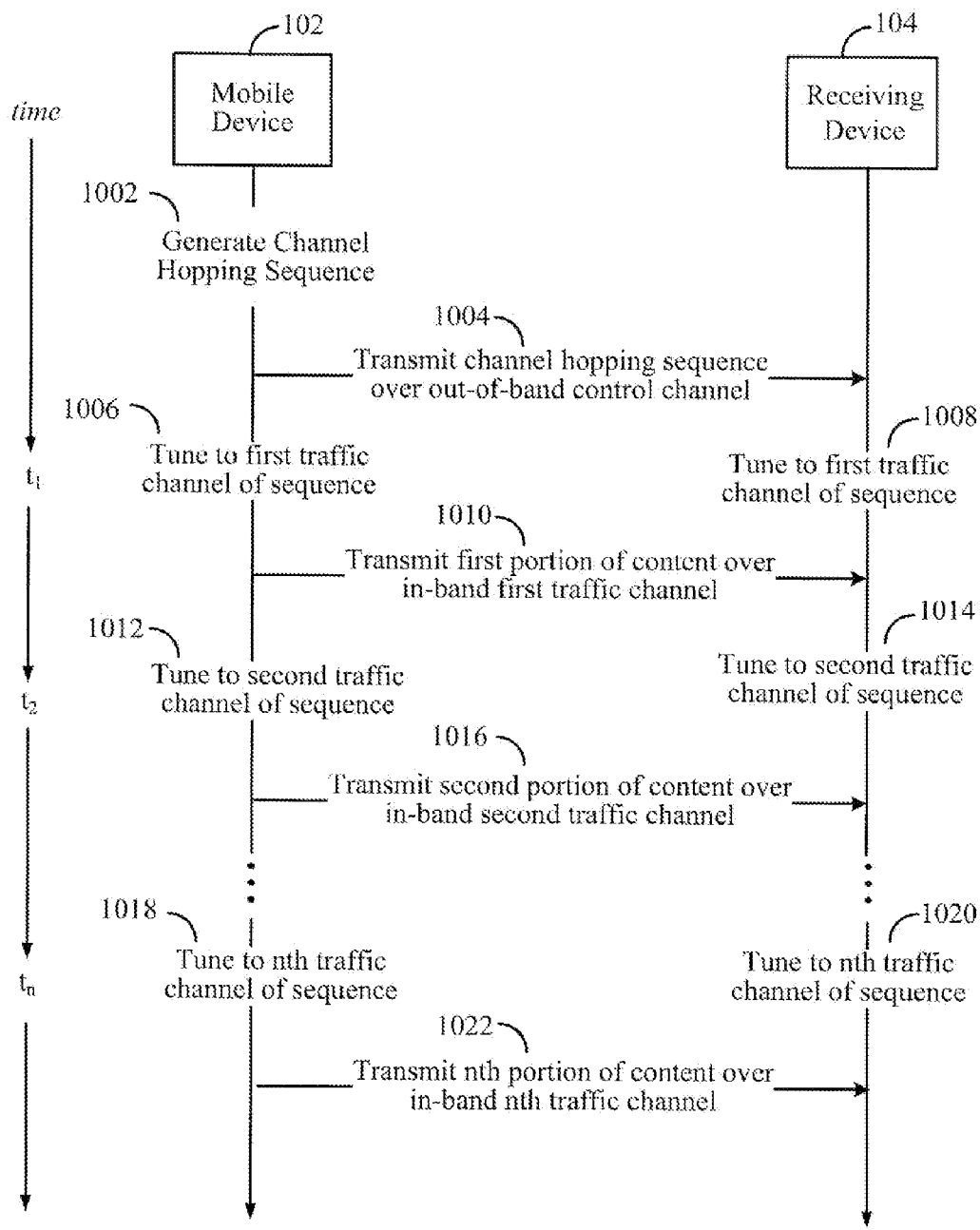
FIG. 10 illustrates a high level time diagram between the mobile device and the receiving device according to another embodiment for securing content transmission using channel hopping.

FIG. 10 illustrates a high level time diagram between the mobile device 102 and the receiving device 104 according to another embodiment for securing content transmission using channel hopping. At step 1002, the mobile device 102 generates a unique channel hopping sequence. For example, a unique channel hopping sequence . may be generated according to:

Channel hopping sequence=prngf(seed, $t_0$) mod max_channel_number where "prngf" represents the pseudorandom number generator function, "seed" represents a starting state, "$t_0$" represents synchronized time zero between the mobile device 102 and the receiving device 104, and "max_channel_number" is the maximum traffic channel number available for transmitting. The pseudorandom channel hopping sequence may be generated using other functions and algorithms known in the art. Generation of the channel hopping sequence using the seed, $t_0$, and the pseudorandom number generator function may be performed, for example, at the traffic channel number generator 218 of the mobile device 102.

At step 1004, the mobile device 102 transmits the channel hopping sequence to the receiving device 104 over an out-of-band communication band 106. For example, in one embodiment, the mobile device 102 may transmit the channel hopping sequence along with timing information, such as $t_0$, to the receiving device 104 through a wireless out-of-band 106 transmission. Such wireless out-of-band communication bands 106 may include the IR spectrum, and/or Bluetooth®, Zigbee®, various 802.11 standards, and/or other short range communication protocols in the UHF to EHF bands.

At steps 1006 and 1008, the mobile device 102 and the receiving device 104, respectively, may tune at time $t_1$ to the first traffic channel of the channel hopping sequence. In one embodiment, the mobile device 102 may tune to the first traffic channel before step 1004 commences.

At step 1010, the mobile device 102 may transmit a first portion of the content over the in-band first traffic channel to the receiving device 104, since both the mobile device 102 and the receiving device 104 have tuned to the first traffic channel. At steps 1012 and 1014, the mobile device 102 and the receiving device 104, respectively, may tune at time $t_2$ to the second traffic channel of the channel hopping sequence. Steps 1012 and 1014 may be performed after step 1010 has completed, i.e., the mobile device 102 and the receiving device 104 tune to the second traffic channel after the receiving device 104 has completely and accurately received the first portion of the content. The channel hopping sequences at the mobile device 102 and the receiving device 104 include timing information which synchronizes both devices 102 and 104 in time so that in-band 108 content transmissions are accurately/timely received by the receiving device 104. At step 1016, the mobile device 102 may transmit a second portion of the content over the in-band second traffic channel to the receiving device 104, since both the mobile device 102 and the receiving device 104 have tuned to the second traffic channel.

In this fashion, the mobile device 102 and the receiving device 104 tune to the subsequent traffic channel according to the channel hopping sequence. The mobile device 102 then transmits a portion of the content to the receiving device 104 on the selected traffic channel. For example, let "n" equal any integer between three and the number of the last portion of the content to be transmitted. Then, at steps 1018 and 1020, the mobile device 102 and the receiving device 104, respectively, may tune at time $t_n$ to the nth traffic channel of the channel hopping sequence. At step 1022, the mobile device 102 may transmit an nth portion of the content over the in-band nth traffic channel to the receiving device 104, since both the mobile device 102 and the receiving device 104 have tuned to the nth traffic channel. After the last portion of the content is transmitted, the process shown in FIG. 10 may be performed again using a different channel hopping sequence for subsequent content transmission sessions.

Figure 11:
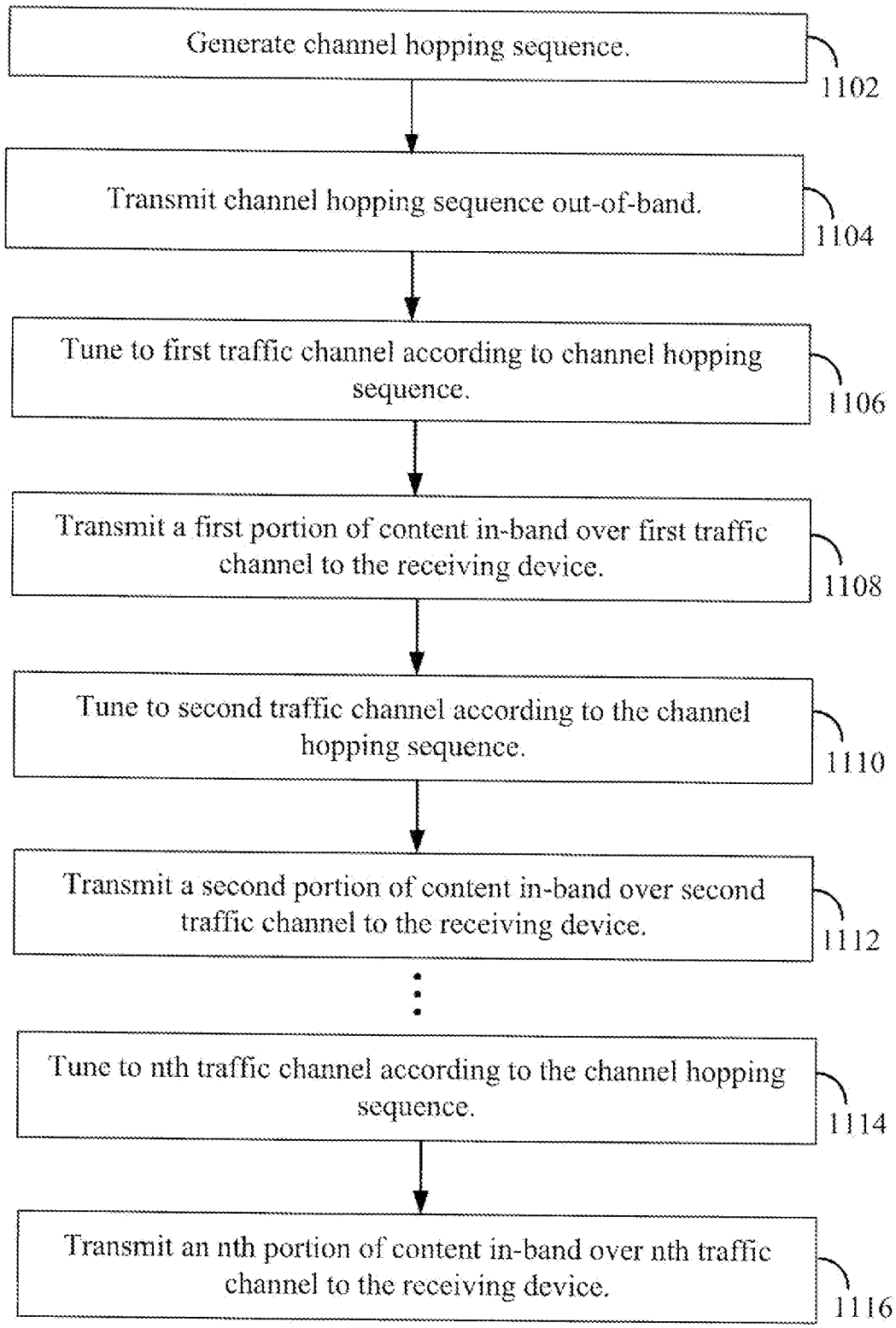
FIG. 11 is a flowchart illustrating an exemplary method operational at the mobile device for securely transmitting content to the receiving device using channel hopping.

FIG. 11 is a flowchart illustrating an exemplary method operational at a mobile device for securely transmitting content to a receiving device using channel hopping. At step 1102, the mobile device 102 generates a unique channel hopping sequence. For example, a unique channel hopping sequence may be generated according to:

Channel hopping sequence=prngf(seed, $t_0$) mod max_channel_number where "prngf" represents the pseudorandom number generator function, "seed" represents a starting state, "$t_0$" represents synchronized time zero between the mobile device 102 and the receiving device 104, and "max_channel_number" is the maximum traffic channel number available for transmitting. The pseudorandom channel hopping sequence may be generated using other functions and algorithms known in the art. Generation of the channel hopping sequence using the seed, $t_0$, and the pseudorandom number generator function may be performed, for example, at the traffic channel number generator 218 of the mobile device 102.

At step 1104, the mobile device 102 transmits the channel hopping sequence to the receiving device 104 over an out-of-band communication band 106. For example, in one embodiment, the mobile device 102 may transmit the channel hopping sequence along with timing information, such as $t_0$, to the receiving device 104 through a wireless out-of-band 106 transmission. Such wireless out-of-band communication bands 106 may include the IR spectrum, and/or Bluetooth®, Zigbee®, various 802.11 standards, and/or other short range communication protocols in the UHF to EHF bands.

At step 1106, the mobile device 102 may tune to the first traffic channel of the channel hopping sequence. In one embodiment, the mobile device 102 may tune to the first traffic channel before step 1104 commences, i.e., the mobile device 102 performs step 1106 before step 1104.

At step 1108, the mobile device 102 may transmit a first portion of the content over the in-band first traffic channel to the receiving device 104. At step 1110, the mobile device 102 may tune to the second traffic channel of the channel hopping sequence. At step 1112, the mobile device 102 may transmit a second portion of the content over the in-band second traffic channel to the receiving device 104.

In this fashion, the mobile device 102 tunes to the subsequent traffic channel according to the channel hopping sequence, and then transmits a portion of the content to the receiving device 104 on the, selected traffic channel. For example, let "n" equal any integer between three and the number of the last portion of the content to be transmitted. Then, at step 1114, the mobile device 102 may tune to the nth traffic channel of the channel hopping sequence. At step 1116, the mobile device 102 may transmit an nth portion of the content over the in-band nth traffic channel to the receiving device 104. After the last portion of the content is transmitted, the process shown in FIG. 11 may be performed again using a different channel hopping sequence for subsequent content transmission sessions.

Figure 12:
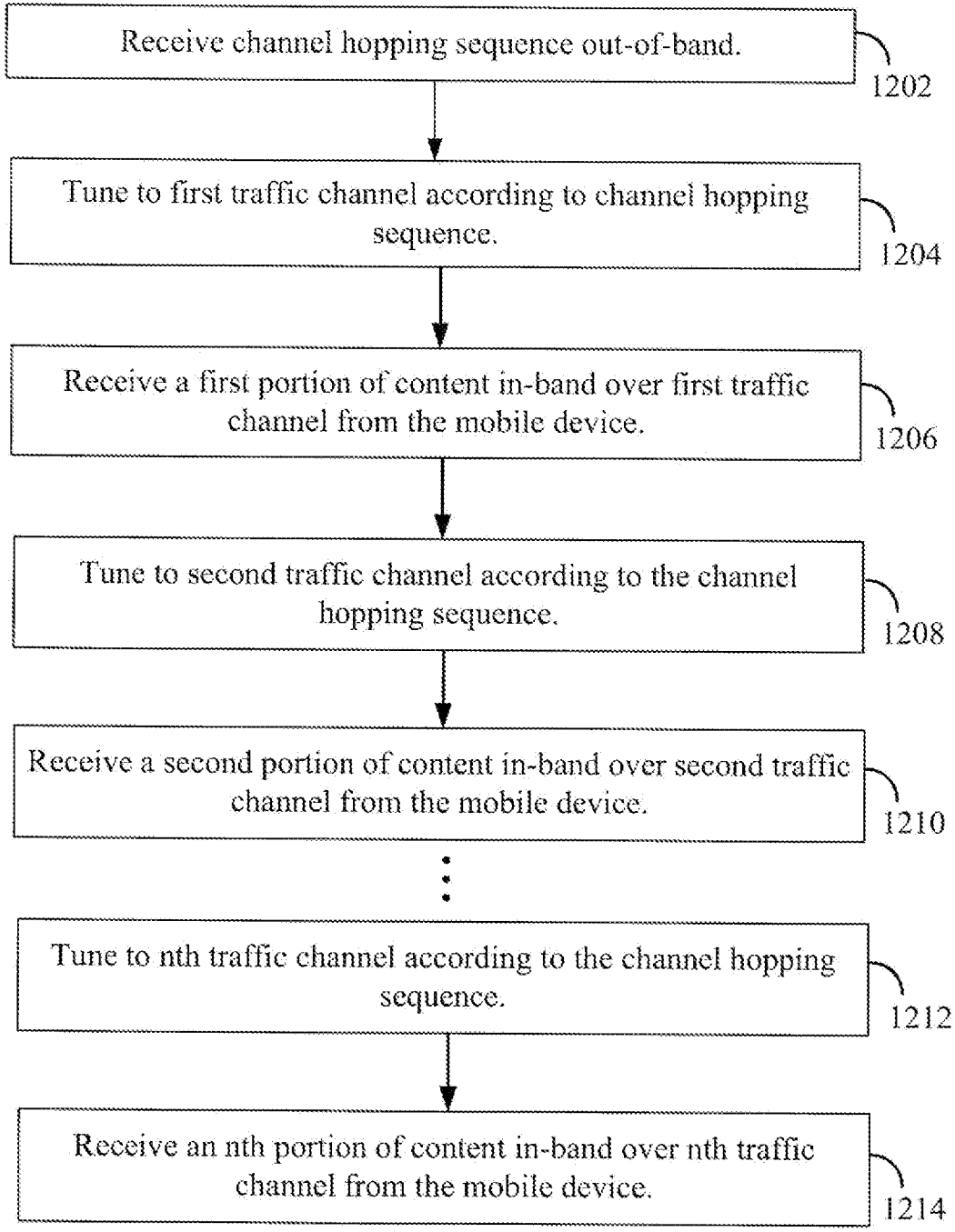
FIG. 12 is a flowchart illustrating an exemplary method operational at the receiving device for securely receiving content from the mobile device using channel hopping.

FIG. 12 is a flowchart illustrating an exemplary method operational at the receiving device 104 for securely receiving content from the mobile device 102 using channel hopping. At step 1202, the mobile device 102 receives the channel hopping sequence from the mobile device 102 over an out-of-band communication band 106. For example, in one embodiment, the receiving device may receive the channel hopping sequence along with timing information, such as $t_o$, to the receiving device 104 through a wireless out-of-band 106 transmission. Such wireless out-of-band communication bands 106 may include the IR spectrum, and/or Bluetooth®, Zigbee®, various 802.11 standards, and/or other short range communication protocols in the UHF to EHF bands.

At step 1204, the receiving device 104 may tune to the first traffic channel of the channel hopping sequence. At step 1206, the receiving device 104 may receive a first portion of the content over the in-band first traffic channel from the mobile device 102. At step 1208, the receiving device 104 may tune to the second traffic channel of the channel hopping sequence. At step 1210, the receiving device 104 may receive a second portion of the content over the in-band second traffic channel from the mobile device 102.

In this fashion, the receiving device 104 tunes to the subsequent traffic channel according to the channel hopping sequence, and then receives a portion of the content from the mobile device 102 on the selected traffic channel. For example, let "n" equal any integer between three and the number of the last portion of the content to be transmitted. Then, at step 1212, the receiving device 104 may tune to the nth traffic channel of the channel hopping sequence. At step 1214, the receiving device 104 may receive an nth portion of the content over the in-band nth traffic channel from the mobile device 102. After the last portion of the content is received, the process shown in FIG. 12 may be performed again using a different channel hopping sequence for subsequent content reception sessions.

Figure 13:
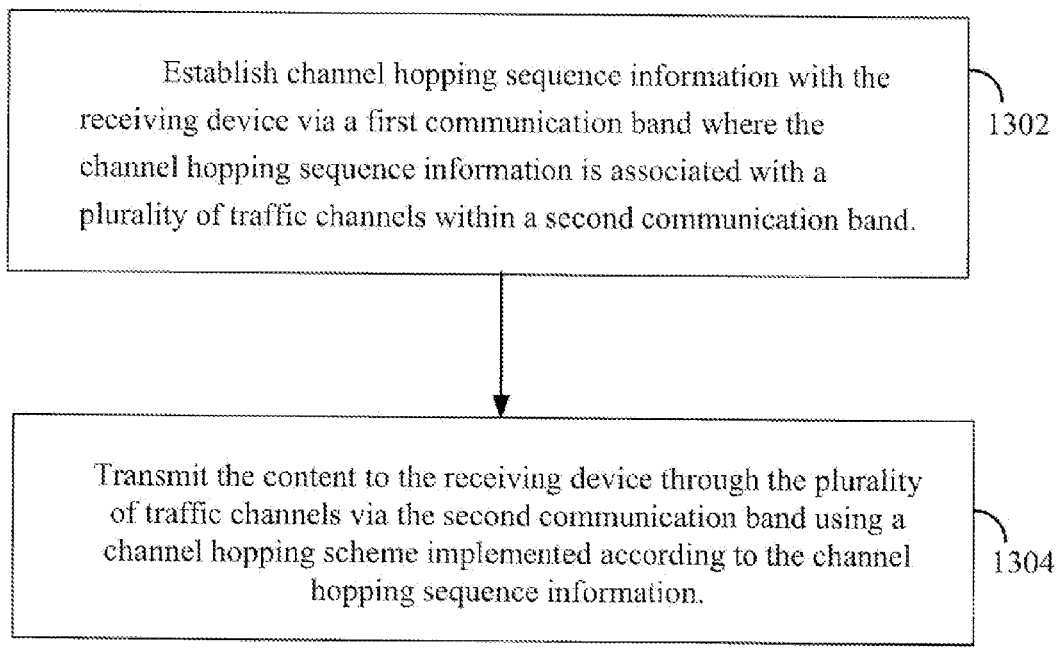
FIG. 13 is a flowchart illustrating an exemplary method operational at the mobile device for securely transmitting content to the receiving device using channel hopping.

FIG. 13 illustrates an exemplary method operational at a mobile device 102 for securing content transmission using channel hopping. At step 1302, the mobile device 102 establishes channel hopping sequence information with the receiving device 104 via a first communication band 106 where the channel hopping sequence information is associated with a plurality of traffic channels within a second communication band 108. At step 1304, the mobile device 102 transmits the content to the receiving device 104 through the plurality of traffic channels via the second communication band 108 using a channel hopping scheme implemented according to the channel hopping sequence information. In one embodiment, step 1302 may include obtaining a channel hopping sequence key from, for example, the traffic channel number generator 218, and transmitting the channel hopping sequence key to the receiving device 104 within the first communication band 106. In another embodiment, step 1304 may include generating a channel hopping sequence using the channel hopping sequence key, and transmitting the content to the receiving device 104 through the plurality of traffic channels within the second communication band 108 according to the channel hopping sequence.

In another embodiment, steps 1302 and steps 1304 may include: transmitting a first traffic channel identifier to the receiving device 104 via the first communication band 106, the first traffic channel identifier indicative of a first traffic channel within the second communication band 108; transmitting a first portion of the content to the receiving device 104 via the first traffic channel within the second communication band 108; transmitting a second traffic channel identifier to the receiving device via the first communication band 106, the second traffic channel identifier indicative of a second traffic channel within the second communication band 108; and transmitting a second portion of the content to the receiving device 104 via the second traffic channel within the second communication band 108.

Figure 14:
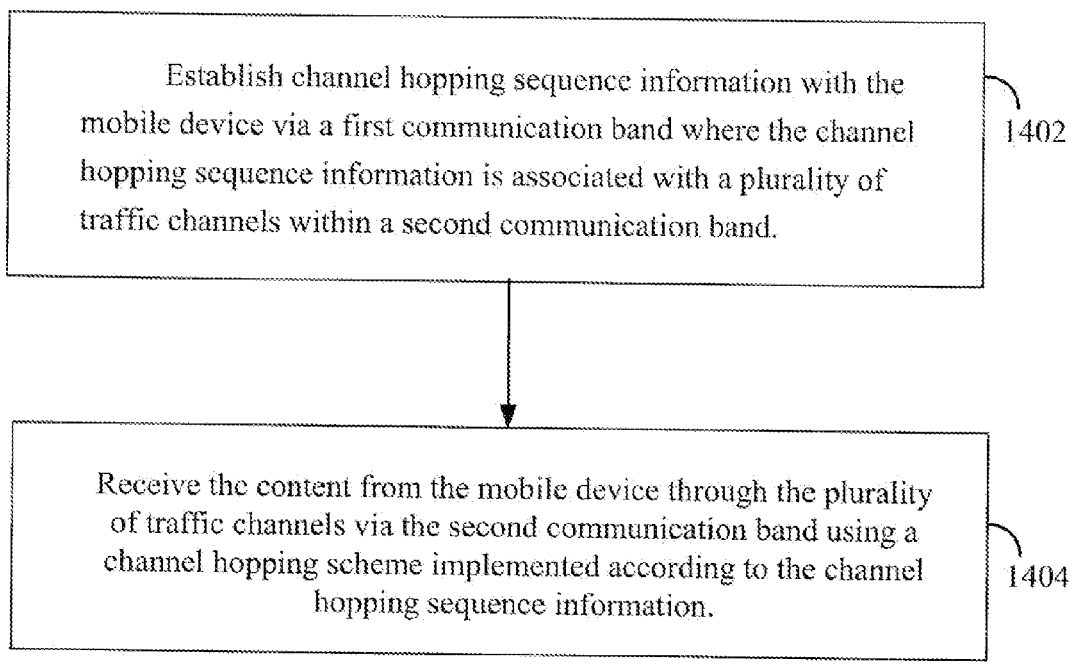
FIG. 14 is a flowchart illustrating an exemplary method operational at the receiving device for securely receiving content from the mobile device using channel hopping.

FIG. 14 illustrates an exemplary method operational at a receiving device 104 for securing content transmission using channel hopping. At step 1402, the receiving device 104 establishes channel hopping sequence information with the mobile device 102 via a first communication band 106 where the channel hopping sequence information is associated with a plurality of traffic channels within a second communication band 108. At step 1404, the receiving device 104 receives the content to the mobile device 102 through the plurality of traffic channels via the second communication band 108 using a channel hopping scheme implemented according to the channel hopping sequence information. In one embodiment, step 1402 may include receiving the channel hopping sequence key from the mobile device 102 within the first communication band 106. In another embodiment, step 1404 may include generating a channel hopping sequence using the channel hopping sequence key, and receiving the content from the mobile device 102 through the plurality of traffic channels within the second communication band 108 according to the channel hopping sequence.

In another embodiment, steps 1402 and steps 1404 may include: receiving a first traffic channel identifier from the mobile device 102 via the first communication band 106, the first traffic channel identifier indicative of a first traffic channel within the second communication band 108; receiving a first portion of the content from the mobile device 102 via the first traffic channel within the second communication band 108; receiving a second traffic channel identifier from the mobile device 102 via the first communication band 106, the second traffic channel identifier indicative of a second traffic channel within the second communication band 108; and receiving a second portion of the content from the mobile device 102 via the second traffic channel within the second communication band 108.

Exemplary Content

The content data described herein may be multimedia content, such as but not limited to, video, music, text, and/or images. In some embodiments, content may be any form of data not limited to multimedia content. For example, the channel hopping techniques described herein can be extended to the transmission of any form of data on the in-band communication band 108, and are not limited to multimedia content data. In some embodiments, the content may be transmitted by the mobile device 102 according to any one of the Advanced Television Systems Committee (ATSC) standards used for the transmission of digital television signals. For example, the content transmitted may be digital data comprising compressed digital video and audio signals that are modulated using 8 VSB, 16 VSB, or 256-QAM modulation. The content may have a bandwidth of 6 MHz, similar to a TV channel signal. Transmitting the content in such a form allows a receiving device 104 that may be a digital television to receive the signal with existing hardware used to receive television signals. For example, the in-band communication band 108 may be an unlicensed UHF band that can be reused by the public, for example, multimedia broadcasts.

The content transmitted in-band 108 does not need to be encrypted and/or scrambled. Protection against unauthorized receivers who may eavesdrop on the transmission is provided by the channel hopping techniques described herein. By not having the channel hopping sequence information, unauthorized receivers will be unable to tune to the correct channels at the proper time to receive the complete content.

In the embodiments disclosed herein, the content transmitted in-band 108 is subject to channel hopping. That is, the content may be broken up into a multitude of portions and each portion may be transmitted across a different traffic channel at a different point in time. In one embodiment, these traffic channels may be different from one another physically. In other words, the traffic channels may differ from one another by having different frequencies. In another embodiment, the traffic channels may be different logical channels (e.g., virtual channels). In other words, the traffic channels may occupy the same physical spectrum but instead differ from each other logically by, for example, having different coding schemes. Thus, the channel hopping sequence information and channel hopping sequence arms the receiving device 104 with information as to what logical channels to expect the content on and to decode the content accordingly.

All of the channel hopping content protection embodiments disclosed herein may be used with a plurality of receiving devices 104. For example, a single mobile device 102 may transmit content in-band 108 and channel hopping sequence information out-of-band 106 to a plurality of receiving device 104 all at once. Moreover, in other embodiments, a plurality of communication bands may be used by the mobile device and the receiving device to transmit the content using channel hopping. For example, the content may transmitted using channel hopping across two or more communication bands that are separate and independent from one another. In addition, the channel hopping sequence information may also be transmitted across two or more communication bands that are separate and independent from one another. Thus, a plurality of communication bands may be used to transmit the content and the channel hopping sequence information.

Additionally, the channel hopping embodiments disclosed herein may allow for the mobile device 102 and receiving device 104 to "hop" from one traffic channel to the subsequent traffic channel either periodically in time, at predetermined varying intervals, and/or after a random time interval that is both known to mobile device 102 and the receiving device 104.

One or more of the components, steps, features and/or functions illustrated in FIGS. 1, 2, 3, 4, 5, 6, 7, 8, 9, 10, 11, 12, 13 and/or 14 may be rearranged and/or combined into a single component, step, feature or function or embodied in several components, steps, or functions. Additional elements, components, steps, and/or functions may also be added without departing from the. invention. For example, the first communication interface 204 and second communication interface 210 of the mobile device 102 shown in FIG. 2 may be combined within a single communication interface that performs the functions of both the first and second communication interfaces 204 and 210. Similarly, the first communication interface 304 and second communication interface 310 of the receiving device 104 shown in FIG. 3 may be combined within a single communication interface that performs the functions of both the first and second communication interfaces 304 and 310. The apparatus, devices, and/or components illustrated in FIGS. 1, 2, and/or 3 may be configured to perform one or more of the methods, features, or steps described in FIGS. 4, 5, 6, 7, 8, 9, 10, 11, 12, 13, and/or 14. The algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational at a mobile device for transmitting content to a receiving device, the method comprising:
    wirelessly transmitting channel hopping sequence information to the receiving device via a first communication band, the channel hopping sequence information associated with a plurality of traffic channels within a second communication band, the second communication band providing at least one of a higher data rate, greater data throughput, and/or greater transmission range than the first communication band; and
    transmitting the content to the receiving device through the plurality of traffic channels via the second communication band using a channel hopping scheme implemented according to the channel hopping sequence information.

2. The method of claim 1, wherein wirelessly transmitting the channel hopping sequence information to the receiving device via the first communication band includes:
    obtaining a channel hopping sequence cryptographic key; and
    transmitting the channel hopping sequence cryptographic key to the receiving device within the first communication band.

3. The method of claim 2, wherein transmitting the content to the receiving device via the second communication band includes:
    generating a channel hopping sequence by inputting the channel hopping sequence cryptographic key into a cryptographic algorithm function; and
    transmitting the content to the receiving device through the plurality of traffic channels within the second communication band according to the channel hopping sequence.

4. The method of claim 1, wherein wirelessly transmitting the channel hopping sequence information to the receiving device via the first communication band includes:
    transmitting a first traffic channel identifier to the receiving device via the first communication band, the first traffic channel identifier indicative of a first traffic channel within the second communication band.

5. The method of claim 4, wherein transmitting the content to the receiving device via the second communication band includes:
    transmitting a first portion of the content to the receiving device via the first traffic channel within the second communication band.

6. The method of claim 5, wherein wirelessly transmitting the channel hopping sequence information to the receiving device via the first communication band further includes:
    transmitting a second traffic channel identifier to the receiving device via the first communication band, the second traffic channel identifier indicative of a second traffic channel within the second communication band.

7. The method of claim 6, wherein transmitting the content to the receiving device via the second communication band further includes:
    transmitting a second portion of the content to the receiving device via the second traffic channel within the second communication band.

8. The method of claim 1, wherein the second communication band is an in-band communication band that is separate and independent to the first communication band that is an out-of-band communication band.

9. The method of claim 1, wherein the channel hopping sequence information is a channel hopping sequence.

10. The method of claim 1, wherein the first communication band is within 1 (one) and 430 (four hundred thirty) terahertz.

11. The method of claim 1, wherein the second communication band is within 300 (three hundred) megahertz and 300 (three hundred) gigahertz, and the content is transmitted to the receiving device wirelessly.

12. The method of claim 1, wherein the plurality of traffic channels are a plurality of physical channels occupying different frequencies in the second communication band.

13. The method of claim 1, wherein the plurality of traffic channels are a plurality of logical channels having different coding schemes.

14. The method of claim 1, wherein the content is unencrypted multimedia content.

15. The method of claim 1, wherein the content includes a video signal component, and the content is transmitted to the receiving device for display on the receiving device.

16. The method of claim 1, further comprising:
    receiving the content at the mobile device from a content provider.

17. The method of claim 16, wherein transmitting the content to the receiving device via the second communication band further includes:
    automatically forwarding the content received from the content provider to the receiving device for display on the receiving device.

18. A mobile device for transmitting content to a receiving device, the mobile device comprising:
    a first communication circuit configured to wirelessly transmit channel hopping sequence information to the receiving device via a first communication band, the channel hopping sequence information associated with a plurality of traffic channels within a second communication band, the second communication band providing at least one of a higher data rate, greater data throughput, and/or greater transmission range than the first communication band; and
    a second communication circuit configured to transmit the content to the receiving device through the plurality of traffic channels via the second communication band using a channel hopping scheme implemented according to the channel hopping sequence information.

19. The mobile device of claim 18, wherein the first communication circuit configured to wirelessly transmit the channel hopping sequence information via the first communication band includes the first communication circuit further configured to
obtain a channel hopping sequence cryptographic key, and
transmit the channel hopping sequence cryptographic key to the receiving device within the first communication band, and
wherein the second communication circuit configured to transmit the content via the second communication band includes the second communication circuit further configured to
generate a channel hopping sequence by inputting the channel hopping sequence cryptographic key into a cryptographic algorithm function, and
transmit the content to the receiving device through the plurality of traffic channels within the second communication band according to the channel hopping sequence.

20. The mobile device of claim 18, wherein the first communication circuit configured to wirelessly transmit the channel hopping sequence information via the first communication band includes the first communication circuit further configured to
transmit a first traffic channel identifier to the receiving device within the first communication band, the first traffic channel identifier indicative of a first traffic channel within the second communication band, and
wherein the second communication circuit configured to transmit the content via the second communication band includes the second communication circuit further configured to
transmit a first portion of the content to the receiving device across the first traffic channel within the second communication band, after transmitting the first traffic channel identifier.

21. A mobile device for transmitting content to a receiving device, the mobile device comprising:
means for wirelessly transmitting channel hopping sequence information to the receiving device via a first communication band, the channel hopping sequence information associated with a plurality of traffic channels within a second communication band, the second communication band providing at least one of a higher data rate, greater data throughput, and/or greater transmission range than the first communication band; and
means for transmitting the content to the receiving device through the plurality of traffic channels via the second communication band using a channel hopping scheme implemented according to the channel hopping sequence information.

22. The mobile device of claim 21, wherein the means for wirelessly transmitting the channel hopping sequence information via the first communication band includes
means for obtaining a channel hopping sequence cryptographic key, and
means for transmitting the channel hopping sequence cryptographic key to the receiving device within the first communication band, and
wherein the means for transmitting the content via the second communication band includes
means for generating a channel hopping sequence by inputting the channel hopping sequence cryptographic key into a cryptographic algorithm function, and
means for transmitting the content to the receiving device through the plurality of traffic channels within the second communication band according to the channel hopping sequence.

23. The mobile device of claim 21, wherein the means for wirelessly transmitting the channel hopping sequence information via the first communication band includes
means for transmitting a first traffic channel identifier to the receiving device within the first communication band, the first traffic channel identifier indicative of a first traffic channel within the second communication band, and
wherein the means for transmitting the content via the second communication band includes
means for transmitting a first portion of the content to the receiving device across the first traffic channel within the second communication band, after transmitting the first traffic channel identifier.

24. A non-transitory processor-readable storage medium having one or more instructions operational at a mobile device for transmitting content to a receiving device, the instructions which when executed by a processor causes the processor to:
wirelessly transmit channel hopping sequence information to the receiving device via a first communication band, the channel hopping sequence information associated with a plurality of traffic channels within a second communication band, the second communication band providing at least one of a higher data rate, greater data throughput, and/or greater transmission range than the first communication band; and
transmit the content to the receiving device through the plurality of traffic channels via the second communication band using a channel hopping scheme implemented according to the channel hopping sequence information.

25. The non-transitory processor-readable storage medium of claim 24, wherein the instructions that cause the processor to wirelessly transmit the channel hopping sequence information via the first communication band further cause the processor to
obtain a channel hopping sequence cryptographic key, and
transmit the channel hopping sequence cryptographic key to the receiving device within the first communication band, and
wherein the instructions that cause the processor to transmit the content via the second communication band further cause the processor to
generate a channel hopping sequence by inputting the channel hopping sequence cryptographic key into a cryptographic algorithm function, and
transmit the content to the receiving device through the plurality of traffic channels within the second communication band according to the channel hopping sequence.

26. The non-transitory processor-readable storage medium of claim 24, wherein the instructions that cause the processor to wirelessly transmit the channel hopping sequence information via the first communication band further cause the processor to
transmit a first traffic channel identifier to the receiving device within the first communication band, the first traffic channel identifier indicative of a first traffic channel within the second communication band, and wherein the instructions that cause the processor to transmit the content within the second communication band further cause the processor to transmit a first portion of the content to the receiving device across the first traffic channel within the second communication band, after transmitting the first traffic channel identifier.

27. A method operational at a receiving device for receiving content from a mobile device, the method comprising:

wirelessly receiving channel hopping sequence information from the mobile device via a first communication band, the channel hopping sequence information associated with a plurality of traffic channels within a second communication band, the second communication band providing at least one of a higher data rate, greater data throughput, and/or greater transmission range than the first communication band; and receiving the content from the mobile device through the plurality of traffic channels via the second communication band using a channel hopping scheme implemented according to the channel hopping sequence information.

28. The method of claim 27, wherein wirelessly receiving the channel hopping sequence information from the mobile device via the first communication band includes:

receiving a channel hopping sequence cryptographic key from the mobile device within the first communication band.

29. The method of claim 28, wherein receiving the content from the mobile device via the second communication band includes:

generating a channel hopping sequence by inputting the channel hopping sequence cryptographic key into a cryptographic algorithm function; and receiving the content from the mobile device through the plurality of traffic channels within the second communication band according to the channel hopping sequence.

30. The method of claim 27, wherein wirelessly receiving the channel hopping sequence information from the mobile device via the first communication band includes:

receiving a first traffic channel identifier from the mobile device via the first communication band, the first traffic channel identifier indicative of a first traffic channel within the second communication band.

31. The method of claim 30, wherein receiving the content from the mobile device via the second communication band includes:

receiving a first portion of the content from the mobile device via the first traffic channel within the second communication band.

32. The method of claim 31, wherein wirelessly receiving the channel hopping sequence information from the mobile device via the first communication band further includes:

receiving a second traffic channel identifier from the mobile device via the first communication band, the second traffic channel identifier indicative of a second traffic channel within the second communication band.

33. The method of claim 32, wherein receiving the content from the mobile device via the second communication band further includes:

receiving a second portion of the content from the mobile device via the second traffic channel within the second communication band.

34. The method of claim 27, wherein the second communication band is an in-band communication band that is separate and independent to the first communication band that is an out-of-band communication band.

35. The method of claim 27, wherein the channel hopping sequence information is a channel hopping sequence.

36. The method of claim 27, wherein the first communication band is within 1 (one) and 430 (four hundred thirty) terahertz, the second communication band is within 300 (three hundred) megahertz and 300 (three hundred) gigahertz, and the content is received from the mobile device wirelessly.

37. The method of claim 27, wherein the plurality of traffic channels are a plurality of physical channels occupying different frequencies in the second communication band.

38. The method of claim 27, wherein the plurality of traffic channels are a plurality of logical channels having different coding schemes.

39. The method of claim 27, wherein the content is unencrypted multimedia content.

40. The method of claim 27, wherein the content includes a video signal component for display on the receiving device.

41. The method of claim 27, wherein receiving the content from the mobile device via the second communication band further includes:

automatically receiving the content from the mobile device via the second communication band, the content originally received from a content provider by the mobile device.

42. A receiving device for receiving content from a mobile device, the receiving device comprising:

a first communication circuit configured to wirelessly receive channel hopping sequence information from the mobile device via a first communication band, the channel hopping sequence information associated with a plurality of traffic channels within a second communication band, the second communication band providing at least one of a higher data rate, greater data throughput, and/or greater transmission range than the first communication band; and a second communication circuit configured to receive the content from the mobile device through the plurality of traffic channels via the second communication band using a channel hopping scheme implemented according to the channel hopping sequence information.

43. The receiving device of claim 42, wherein the first communication circuit configured to wirelessly receive the channel hopping sequence information via the first communication band includes the first communication circuit further configured to receive a channel hopping sequence cryptographic key from the mobile device within the first communication band, and wherein the second communication circuit configured to receive the content from the mobile device via the second communication band includes the second communication circuit further configured to generate a channel hopping sequence by inputting the channel hopping sequence cryptographic key into a cryptographic algorithm function, and receive the content from the mobile device through the plurality of traffic channels within the second communication band according to the channel hopping sequence.

44. The receiving device of claim 42, wherein the first communication circuit configured to wirelessly receive the channel hopping sequence information via the first communication band includes the first communication circuit further configured to receive a first traffic channel identifier from the mobile device via the first communication band, the first traffic channel identifier indicative of a first traffic channel within the second communication band, and wherein the second communication circuit configured to receive the content from the mobile device via the second communication band includes the second communication circuit further configured to receive a first portion of the content from the mobile device via the first traffic channel within the second communication band.

45. A receiving device for receiving content from a mobile device, the receiving device comprising:

means for wirelessly receiving channel hopping sequence information from the mobile device via a first communication band, the channel hopping sequence information associated with a plurality of traffic channels within a second communication band, the second communication band providing at least one of a higher data rate, greater data throughput, and/or greater transmission range than the first communication band; and means for receiving the content from the mobile device through the plurality of traffic channels via the second communication band using a channel hopping scheme implemented according to the channel hopping sequence information.

46. The receiving device of claim 45, wherein the means for wirelessly receiving the channel hopping sequence information via the first communication band includes means for receiving a channel hopping sequence cryptographic key from the mobile device within the first communication band, and wherein the means for receiving the content from the mobile device via the second communication band includes means for generating a channel hopping sequence by inputting the channel hopping sequence cryptographic key into the cryptographic algorithm function, and means for receiving the content from the mobile device through the plurality of traffic channels within the second communication band according to the channel hopping sequence.

47. The receiving device of claim 45, wherein the means for wirelessly receiving the channel hopping sequence information via the first communication band includes means for receiving a first traffic channel identifier from the mobile device via the first communication band, the first traffic channel identifier indicative of a first traffic channel within the second communication band, and wherein the means for receiving the content from the mobile device via the second communication band includes means for receiving a first portion of the content from the mobile device via the first traffic channel within the second communication band.

48. A non-transitory processor-readable storage medium having one or more instructions operational on a receiving device for receiving content from a mobile device, the instructions which when executed by a processor causes the processor to:

wirelessly receive channel hopping sequence information from the mobile device via a first communication band, the channel hopping sequence information associated with a plurality of traffic channels within a second communication band, the second communication band providing at least one of a higher data rate, greater data throughput, and/or greater transmission range than the first communication band; and receive the content from the mobile device through the plurality of traffic channels via the second communication band using a channel hopping scheme implemented according to the channel hopping sequence information.

49. The non-transitory processor-readable storage medium of claim 48, wherein the instructions that cause the processor to wirelessly receive the channel hopping sequence information via the first communication band further cause the processor to receive a channel hopping sequence cryptographic key from the mobile device within the first communication band, and wherein the instructions that cause the processor to receive the content from the mobile device via the second communication band further cause the processor to generate a channel hopping sequence by inputting the channel hopping sequence cryptographic key into a cryptographic algorithm function, and receive the content from the mobile device through the plurality of traffic channels within the second communication band according to the channel hopping sequence.

50. The non-transitory processor-readable storage medium of claim 48, wherein the instructions that cause the processor to wirelessly receive the channel hopping sequence information via the first communication band further cause the processor to receive a first traffic channel identifier from the mobile device via the first communication band, the first traffic channel identifier indicative of a first traffic channel within the second communication band, and wherein the instructions that cause the processor to receive the content from the mobile device via the second communication band further cause the processor to receive a first portion of the content from the mobile device via the first traffic channel within the second communication band.

* * * * *